US008429936B2

(12) United States Patent
Allan et al.

(10) Patent No.: US 8,429,936 B2
(45) Date of Patent: Apr. 30, 2013

(54) METHOD OF MAKING A GLASS SHEET USING CONTROLLED COOLING

(75) Inventors: Douglas Clippinger Allan, Corning, NY (US); Olus Naili Boratav, Ithaca, NY (US); Andrey V. Filippov, Painted Post, NY (US); Allan Mark Fredholm, Hericy (FR); Leonard R. Kent, Killington, VT (US); Lewis Kirk Klingensmith, Corning, NY (US); Terry Jay Ott, Horseheads, NY (US); Randy Lee Rhoads, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 637 days.

(21) Appl. No.: 11/989,436

(22) PCT Filed: Jul. 21, 2006

(86) PCT No.: PCT/US2006/028461
§ 371 (c)(1),
(2), (4) Date: Jan. 24, 2008

(87) PCT Pub. No.: WO2007/014066
PCT Pub. Date: Feb. 1, 2007

(65) Prior Publication Data
US 2009/0100873 A1  Apr. 23, 2009

(30) Foreign Application Priority Data

Jul. 21, 2005  (EP) .................................... 05291565

(51) Int. Cl.
*C03B 17/06* (2006.01)
*C03B 25/12* (2006.01)
*C03B 27/052* (2006.01)

(52) U.S. Cl.
USPC ....................................... 65/95; 65/90; 65/96

(58) Field of Classification Search ........................ None
See application file for complete search history.

(56) References Cited

U.S. PATENT DOCUMENTS 3,149,949 A * 9/1964 Dockerty et al. ................. 65/53
3,442,748 A * 5/1969 Huart ............................ 428/143
(Continued)

FOREIGN PATENT DOCUMENTS

DE  103 05 141  8/2004
DE  10305141 A1  8/2004
(Continued)

OTHER PUBLICATIONS

DE10305141 machine translation as provided by: http://epo.worldlingo.com/wl/epo/epo.html?ACTION=description-retrieval&OPS=ops.epo.org&LOCALE=en_GB&FORMAT=docdb&COUNTRY=DE&NUMBER=10305141&KIND=A1&T=1 on Sep. 23, 2010.*

(Continued)

*Primary Examiner* — Jodi C Franklin
(74) *Attorney, Agent, or Firm* — Kevin M. Able

(57) ABSTRACT

Methods of drawing glass sheet via a downdraw process are provided. In certain aspects, the methods utilize rapid cooling below the root (70) of the forming apparatus (10). Such rapid cooling can, for example, facilitate the use of glass having a liquidus viscosity less than about 100,000 poise. In other aspects, the methods utilize slow cooling between the viscosities of $10^{11}$ poises and $10^{14}$ poises. Such slow cooling can facilitate the production of glass substrates which exhibit low levels of compaction. In further aspects, substrates are removed from the glass sheet at elevated temperatures which can facilitate increases in the production rates of downdraw machines. In still further aspects, rapid cooling below the root, slow cooling between the viscosities of $10^{11}$ poises and $10^{14}$ poises, and/or substrate removal at elevated temperatures are combined. Such combinations can facilitate economically effective utilization of downdraw equipment.

8 Claims, 16 Drawing Sheets

U.S. PATENT DOCUMENTS

| | | | | |
|---|---|---|---|---|
| 3,955,013 | A * | 5/1976 | Kivlighn, Jr. | 438/479 |
| 4,566,893 | A * | 1/1986 | Hopkins et al. | 65/69 |
| 6,374,640 | B1 * | 4/2002 | Fotheringham et al. | 65/111 |
| 6,782,716 | B2 * | 8/2004 | Moore et al. | 65/30.1 |
| 6,871,514 | B2 * | 3/2005 | Muschik et al. | 65/33.9 |
| 7,690,221 | B2 * | 4/2010 | Pitbladdo | 65/195 |
| 2003/0029199 | A1 * | 2/2003 | Pitbladdo | 65/195 |
| 2003/0121287 | A1 * | 7/2003 | Chalk et al. | 65/90 |
| 2004/0055335 | A1 * | 3/2004 | Lee | 65/95 |
| 2004/0154336 | A1 * | 8/2004 | Pitbladdo | 65/53 |
| 2004/0224834 | A1 * | 11/2004 | Kohli | 501/70 |
| 2005/0084440 | A1 * | 4/2005 | Chacon et al. | 423/328.1 |
| 2005/0092027 | A1 * | 5/2005 | Pitbladdo | 65/195 |
| 2005/0120748 | A1 * | 6/2005 | Xun et al. | 65/53 |
| 2005/0138966 | A1 * | 6/2005 | Pitbladdo | 65/29.21 |
| 2007/0062219 | A1 * | 3/2007 | Blevins et al. | 65/91 |
| 2007/0220920 | A1 * | 9/2007 | Allaire et al. | 65/29.12 |
| 2008/0194394 | A1 * | 8/2008 | Lecomte | 501/67 |
| 2011/0177287 | A1 * | 7/2011 | Kato et al. | 428/141 |

FOREIGN PATENT DOCUMENTS

| | | |
|---|---|---|
| JP | 10-53425 | 8/1996 |
| WO | 2005/055284 A2 | 6/2005 |

OTHER PUBLICATIONS

Askeland Donald R. et al. The Science and ENgineering of Materials, Sixth Edition. Published by GLobal Engineering, Copyright 2011,2006 p. 305 as viewed at http://books.google.com/books?id=fJanis-q6GkC&Ipg=PA305&ots=EL6KDcKI7S&dq=annealing%20glass%20cool%20stress&pg=PR4#v=onepage&q=annealing%20glass%20cool%20stress&f=true on Jul. 23, 2012.*

Laurence H. Van Vlack, "Materials for Engineering: Concepts and Applications", The University of Michigan, Addison-Wesley Publishing Company, pp. 357-358.

* cited by examiner

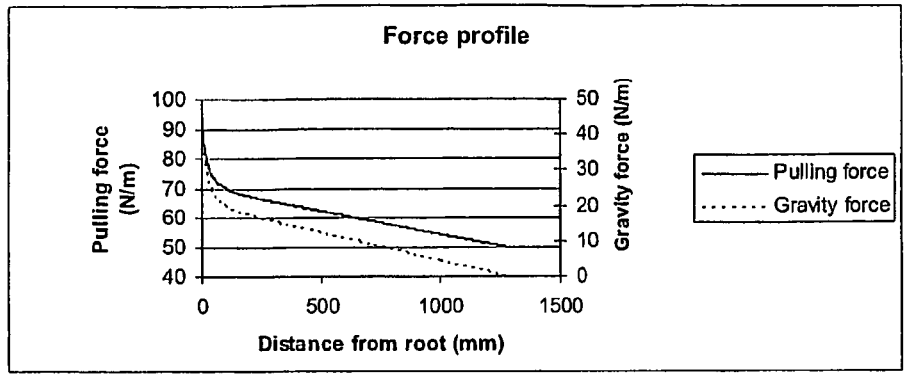

FIG. 9

|  |  | A | B | C | D |
|---|---|---|---|---|---|
| Cooling Parameters | a (°C) | 302.0 | 252.6 | 647.2 | 252.6 |
|  | b (°C.mm) | 1160834.9 | 1288760.8 | 158618.8 | 1288760.7 |
|  | c (mm) | 1321.0 | 1321.0 | 273.0 | 1321.0 |
| Flow (Pounds per hour per inch width) |  | 11 | 11 | 11 | 28.45 |
| Initial thickness (mm) |  | 56 | 40 | 40 | 56 |
| Pulling force (N/m) |  | 50.0 | 3.5 | 50.0 | 50.0 |
| Ratio of gravity forces to total downward force |  | 47% | 91% | 36% | 47% |
| Initial temperature at root (°C) |  | 1181 | 1228 | 1228 | 1228 |
| Initial viscosity at root (poise) |  | 130000 | 50000 | 50000 | 50000 |
| Final thickness (mm) |  | 0.7 | 0.7 | 0.7 | 0.7 |
| Time for glass to reach 0.71 mm thickness from root (sec) |  | 54.6 | 40.4 | 19.2 | 20.9 |
| Distance from root to reach 0.71 mm thickness (mm) |  | 394 | 360 | 187 | 386 |
| Mean heat flux to 0.71 thickness (W/m²) |  | 31620 | 35815 | 77940 | 91006 |

FIG. 10

METHOD OF MAKING A GLASS SHEET USING CONTROLLED COOLING

BACKGROUND OF THE INVENTION

1. Field of the Invention

This invention is directed to methods of forming a glass sheet (glass ribbon) and, in particular, to methods of forming a glass sheet using controlled cooling between the location where the sheet is formed (e.g., the root of an isopipe) and the location where individual substrates are separated from the sheet (e.g., the location where the ribbon is scored as the initial step of the separation process).

2. Technical Background

Glass display panels in the form of liquid crystal displays (LCDs) are being used in an increasing variety of applications—from hand-held personal data assistants (PDAs) to computer monitors to television displays. These applications require glass sheets which have pristine, defect-free surfaces. LCDs are comprised of at least several thin sheets of glass which are sealed together to form an envelope. It is highly desirable that the glass sheets which comprise these displays do not deform when cut, thereby maintaining the proper registration, or alignment, between the elements. Residual stress which may be frozen into the glass, if relieved by cutting the glass into smaller portions, may result in deformation of the glass, and a loss of proper registration.

Typically, LCDs are of the amorphous silicon ($\alpha$-Si) thin film transistor (TFT) or polycrystalline-silicon ($\rho$-Si or poly-Si) TFT type. Poly-Si has a much higher drive current and electron mobility, thereby decreasing the response time of the pixels. Further, it is possible, using $\rho$-Si processing, to build the display drive circuitry directly on the glass substrate. By contrast, $\alpha$-Si requires discrete driver chips that must be attached to the display periphery utilizing integrated circuit packaging techniques.

The evolution from $\alpha$-Si to $\rho$-Si has presented a major challenge to the use of a glass substrate. Poly-Si coatings require much higher processing temperatures than do $\alpha$-Si, in the range of 600-700° C. Thus, the glass substrate must be thermally stable at such temperatures. Thermal stability (i.e. thermal compaction or shrinkage) is dependent upon both the inherent viscous nature of a particular glass composition (as indicated by its strain point) and the thermal history of the glass sheet as determined by the manufacturing process. High temperature processing, such as required by poly-Si TFTs, may require long heat treatment times for the glass substrate to ensure low compaction, e.g., 5 hours at 600° C.

One method of producing glass for optical displays is by an overflow downdraw process (also known as a fusion downdraw process). This process produces pristine surface quality compared to other processes referred to as the float and slot techniques in the literature. U.S. Pat. Nos. 3,338,696 and 3,682,609 (Dockerty), which are incorporated in their entirety herein by reference, disclose a fusion downdraw process which includes flowing a molten glass over the edges, or weirs, of a forming wedge, commonly referred to as an isopipe. See also U.S. Patent Publications Nos. 2005/0268657 and 2005/0268658, the contents of which are also incorporated herein in their entireties by reference. The molten glass flows over converging forming surfaces of the isopipe, and the separate flows reunite at the apex, or root, where the two converging forming surfaces meet, to form a glass ribbon, or sheet. Thus, the glass which has been in contact with the forming surfaces is located in the inner portion of the glass sheet, and the exterior surfaces of the glass sheet are contact-free. The sheet as it evolves decreases in thickness under the forces of gravity and pulling equipment. In particular, pulling rolls are placed downstream of the isopipe root and capture edge portions of the ribbon to adjust the rate at which the ribbon leaves the isopipe, and thus help determine the thickness of the finished sheet. The pulling equipment is located sufficiently downstream so that the glass has cooled and become rigid enough to be pulled. The contacted edge portions are later removed from the finished glass sheet. As the glass ribbon descends from the root of the isopipe past the pulling rolls, it cools to form a solid, elastic glass ribbon, which may then be cut to form smaller sheets of glass.

The construction of a fusion downdraw line requires a substantial capital investment. Because substrates produced by such a line are typically employed in the manufacture of consumer products (see above), there exists a continual pressure to reduce costs. Such cost reductions can be achieved by, among other things, increasing a line's output and/or by decreasing the costs; e.g., capital costs, involved in constructing the line. As discussed below, various aspects of the present invention can be used to implement either or both of these cost reduction approaches, i.e., these aspects of the invention can be used to increase draw speed and thus the output of a line and/or can be used to decrease the overall length of a line, e.g., the vertical height between the root of the isopipe where the glass sheet is formed and the bottom-of-the-draw where substrates are separated from sheet. (As known in the art, after separation from the glass sheet, substrates undergo further processing, e.g., removal of the bead portions at the sides of the substrate, subdivision into smaller pieces, edge grinding, etc., before being used in the manufacture of, for example, liquid crystal displays. The word "substrate" is used herein and in the art to refer to both the individual panes separated from the glass ribbon prior to any further processing and the ultimate substrate used by LCD manufacturers, it being evident from the context which meaning is applicable.)

Thermal instability of glass substrates used in the production of liquid crystal displays has been a longstanding problem in the art. To address this problem, glass manufacturers often heat treat glass substrates prior to shipping them to customers so that the sheets do not shrink or shrink very little when used in the customers' processes. Such heat treatments are known as "pre-shrinking" or "pre-compacting." The heat treatments involve further handling of the substrates thus increasing the chances of damage to the surfaces of the substrates, as well as increasing overall manufacturing costs.

Quantitatively, compaction is the change in length per unit length exhibited by a glass substrate as a result of subtle changes in glass structure produced by thermal cycling (i.e., compaction is strain resulting from the glass' thermal history). Compaction can be determined physically by placing two marks on a glass substrate and measuring the initial distance between the marks. The substrate is then subjected to a heat treatment cycle and returned to room temperature. The distance between the marks is then re-measured. Compaction in parts-per-million (ppm) is then given by:

$$\text{compaction} = 10^6 \cdot (\text{distance before} - \text{distance after})/(\text{distance before}).$$

Various heat treatment cycles can be used to simulate the heating and cooling that a substrate will experience during, for example, the manufacture of a liquid crystal display. Examples of suitable heat treatment cycles that can be used to determine the expected compaction of glass substrates are set forth below (see Table 4).

In addition to physically testing glass substrates, compaction can also be predicted using computer models for the stress relaxation of glass materials when subjected to prescribed temperatures for prescribed periods of time. Examples of such modeling appear in Buehl, W. M., and Ryszytiwslkyj, W. P., "Thermal Compaction Modeling of Corning Code 7059 Fusion Drawn Glass", SID International Symposium, Digest of Technical Papers, *SID* 22, 667-670 (1991). See also Narayanaswami, O. S., "Stress and structural relaxation in tempering glass", J. Amer. Ceramic Soc., 61 (3-4) 146-152 (1978). The models are semi-empirical in that a fit is made to measured strains resulting from a variety of thermal cycles applied to a particular type of glass, and then the fit is used to predict compaction for the thermal history of interest, e.g., thermal histories of the type shown in Table 4. The compaction data set forth below was obtained using the semi-empirical modeling approach as opposed to physical testing.

Because compaction is an important end customer specification, historically, as flow increases have been made, i.e., throughput increased, the fusion process has been scaled linearly to allow sufficient time at temperature to maintain the same compaction of the finished substrates as existed before the flow increase. Although this approach does work, it has the serious drawback that it requires longer distances between the root of the isopipe and the location where substrates are separated from the glass sheet. These longer distances take up additional real estate and capital. Indeed, due to the physical constraints of existing facilities, this approach to dealing with compaction can limit the maximum flow available to a given glass forming installation. Increasing the flow beyond these historical and physical constraints would provide a significant and important cost advantage.

Another limitation of the fusion draw process as currently practiced relates to the material properties of the glass to be processed. It is well known that when a glass composition initially in the molten state is exposed to a lower temperature for a significant amount of time, the development of crystal phases will initiate. The temperature and viscosity where these crystal phases start to develop is known as the liquidus temperature and liquidus viscosity, respectively.

As known and currently practiced, when using the fusion draw process it is necessary to maintain the viscosity of the glass at the location where it leaves the isopipe at a viscosity greater than about 100,000 poises, more typically greater than about 130,000 poise. If the glass has a viscosity lower than about 100,000 poise, the quality of the sheet degrades, e.g. in terms of maintaining the sheet flatness and controlling the thickness of the sheet across its width, and glass sheet thus produced is no longer suitable for display applications.

According to current practice, if a glass composition which has a liquidus viscosity of less than about 100,000 poises is processed under conditions such that the dimensional quality of the glass sheet would be adequate, devitrification may develop on the isopipe and lead to crystalline particulates in the glass sheets. This is not acceptable for display glass applications.

SUMMARY

Embodiments of a first aspect of the present invention (the "rapid cooling" aspect) provide a method for manufacturing a sheet of glass comprising flowing a molten glass over converging forming surfaces to form a glass sheet, the forming surfaces converging at a lower apex and cooling the glass sheet at a rate wherein an average heat flux from the glass sheet is equal to or greater than 40,000 W/m² between the lower apex and a point on the glass sheet where the glass sheet has reached a final formed thickness.

The first aspect of the invention also provides a method for manufacturing a sheet of glass comprising flowing a molten glass over converging forming surfaces to form a glass sheet, the forming surfaces converging at a lower apex and cooling the glass sheet at a rate wherein an average rate R of viscosity change with distance is equal to or greater than 6.0 meter$^{-1}$, where R is given by:

$$R=(\log_{10}(\mu_{final\ thickness}/\text{poise})-\log_{10}(\mu_{apex}/\text{poise}))/D$$

where:
 (a) $\mu_{apex}$ is the viscosity at a centerline of the glass sheet at the lower apex,
 (b) $\mu_{final\ thickness}$ is the viscosity at the centerline where the glass sheet has reached a final thickness,
 (c) D is the distance along the centerline between said two viscosities, and
 (d) said viscosities are in poises.

In accordance with certain applications of the above embodiments, the liquidus viscosity of the glass is less than about 100,000 poises; preferably less than about 80,000 poises; more preferably less than about 50,000 poises.

In accordance with an embodiment of the first aspect of the invention, the glass sheet is preferably formed at a flow density above about 12 pounds per hour per inch, more preferably above about 15 pounds per hour per inch, and most preferably above about 20 pounds per hour per inch width and is within 1.5% of its final thickness at a distance less than about 400 mm below the lower apex. Preferably, the glass sheet reaches its final thickness less than about 300 mm below the lower apex. The method may further include applying a total pulling force to the glass sheet of at least about 50 N/m. The apex of the converging forming surfaces may be heated by a heating element.

Preferably, both the average heat flux criterion and the R criterion are satisfied, although in some cases, only one of the criterion may be satisfied in particular applications of the first aspect of the invention.

Embodiments of a second aspect of the present invention (the "slow cooling" aspect) provide a method for manufacturing a sheet of glass comprising flowing a molten glass over converging forming surfaces to form a glass sheet, the forming surfaces converging at a lower apex and cooling the glass sheet wherein as the viscosity at the centerline of the glass sheet increases from $10^{11}$ poises to $10^{14}$ poises, an average heat flux from the glass sheet is less than or equal to 20,000 W/m².

The second aspect of the invention also provides a method for manufacturing a sheet of glass comprising flowing a molten glass over converging forming surfaces to form a glass sheet, the forming surfaces converging at a lower apex and cooling the glass sheet at a rate wherein as the viscosity at the centerline of the glass sheet increases from $10^{11}$, poises to $10^{14}$ poises, an average rate $R_{11-14}$ of viscosity change with distance is less than or equal to 4.0 meter$^{-1}$, where $R_{11-14}$ is given by:

$$R_{11-14}=3/D_{11-14}$$

and where $D_{11-14}$ is the distance along the centerline between said two viscosities.

Preferably, both the average heat flux criterion and the R criterion are satisfied, although in some cases, only one of the criterion may be satisfied in particular applications of the second aspect of the invention.

Embodiments of a third aspect of the present invention provide a method for increasing the rate at which a glass sheet is produced by a fusion downdraw machine where the machine comprises a forming wedge and the method comprises (a) increasing the flow of molten glass over the forming wedge, and (b) increasing the initial cooling rate of the sheet as the sheet leaves the forming wedge. In accordance with certain applications of this aspect of the invention, the cooling rate of the glass sheet is reduced in the region of the sheet where the viscosity of the glass making up the sheet increases from $10^{11}$ poises to $10^{14}$ poises.

Embodiments of a fourth aspect of the present invention provide a method for increasing the rate at which a glass sheet is produced by a fusion downdraw machine comprising increasing the flow of molten glass through the machine and changing the relative lengths of a viscous, a visco-elastic, and an elastic zone of the sheet.

Embodiments of a fifth aspect of the present invention provide a method for increasing the rate at which a glass sheet is produced by a fusion downdraw machine comprising increasing the temperature at which substrates are separated from the glass sheet.

Embodiments of a sixth aspect of the present invention provide a fusion downdraw machine for producing a glass sheet comprising:
  (a) forming surfaces which converge at a lower apex;
  (b) pulling rolls which are separated from the lower apex by a distance $D_{PR}$; and
  (c) separation apparatus which forms a score line in the glass sheet, said score line being separated from the apex by a distance $D_{SL}$;
  wherein:
    $D_{PR}/D_{SL} \geq 0.5$.

Embodiments of a seventh aspect of the present invention provide a fusion downdraw machine for producing a glass sheet at a glass flow rate FR comprising:
  (a) forming surfaces which converge at a lower apex; and
  (b) separation apparatus which forms a score line in the glass sheet, said score line being separated from the apex by a distance $D_{SL}$;
  wherein $D_{SL}$ and FR satisfy the relationship:
    $D_{SL}/FR \leq 8 \cdot (1.0 + 0.1 \cdot (T_S - 667))$,
where $T_S$ is the strain point of the glass in ° C., $D_{SL}$ is in inches, and FR is in pounds/hour/inch.

Embodiments of an eighth aspect of the present invention provide a fusion downdraw machine for producing a glass sheet comprising:
  (a) a forming wedge having a lower apex; and
  (b) a cooling section adjacent the forming wedge configured such that a glass sheet drawn from the forming wedge is cooled at a rate wherein an average heat flux from the glass sheet is equal to or greater than 40,000 W/m² between the lower apex and a point on the glass sheet where the glass sheet has reached a final formed thickness.

The invention will be understood more easily and other objects, characteristics, details and advantages thereof will become more clearly apparent in the course of the following explanatory description, which is given, without in any way implying a limitation, with reference to the attached figures. It is intended that all such additional systems, methods, features and advantages be included within this description, be within the scope of the present invention, and be protected by the accompanying claims. Further, it is to be understood that the various aspects and embodiments of the invention disclosed in this specification and in the figures can be used in any and all combinations.

BRIEF DESCRIPTION OF THE DRAWINGS

FIG. 9 illustrates plots of the pulling force contributed by both gravity and the pulling rolls in the standard case (case A).

FIG. 10 is a chart of process parameters for four comparative hypothetical examples of drawing a glass sheet via a downdraw process.

DETAILED DESCRIPTION

Figure 1:
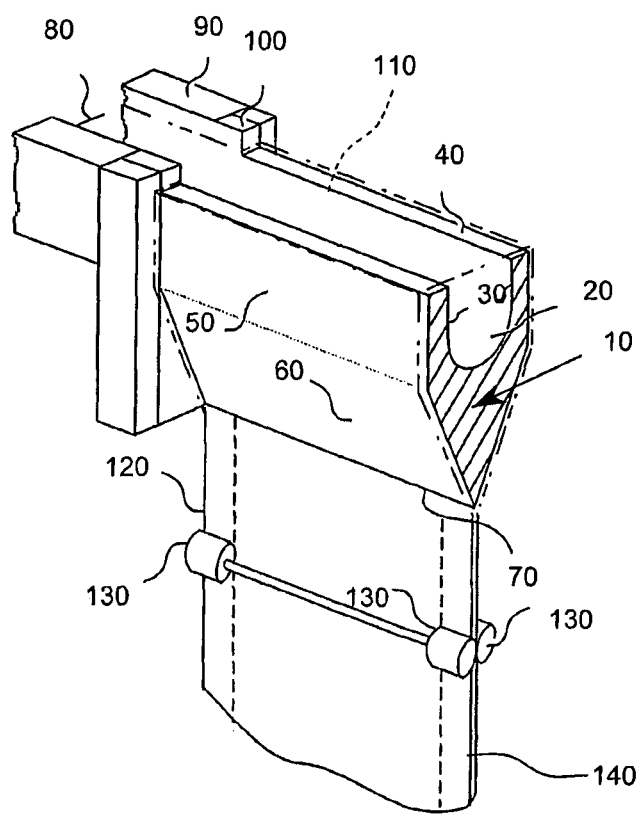
FIG. 1 is a perspective, partial cross sectional view of a fusion downdraw apparatus.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

As used herein, a downdraw glass sheet manufacturing process refers to any form of glass sheet manufacturing processes in which glass sheets are formed while viscous glass is drawn in a downward direction. In a fusion downdraw forming process, molten glass flows into a trough, then overflows and runs down both sides of a pipe, fusing together at what is known as the root (where the pipe ends and the two overflow portions of glass rejoin), and is drawn downward until cool. The overflow glass sheet manufacturing process can be described with the help of FIG. 1, wherein an overflow trough member or forming wedge 10 includes an upwardly open channel 20 bounded on its longitudinal sides by wall portions 30, which terminate at their upper extent in opposed longitudinally-extending overflow lips or weirs 40. The weirs 40 communicate with opposed outer sheet forming surfaces of forming wedge 10. As shown, forming wedge 10 is provided with a pair of substantially vertical forming surface portions 50 which communicate with weirs 40, and a pair of downwardly inclined converging surface portions 60 which terminate at a substantially horizontal lower apex or root 70 forming a preferably straight glass draw line.

Molten glass 80 is fed into channel 20 by means of delivery passage 90 communicating with channel 20. The feed into channel 20 may be single ended or, if desired, double ended. A pair of restricting dams 100 are provided above overflow weirs 40 adjacent each end of channel 20 to direct the overflow of the free surface 110 of molten glass 80 over overflow weirs 40 as separate streams, and down opposed forming surface portions 50, 60 to root 70 where the separate streams, shown in chain lines, converge to form a sheet of virgin-surfaced glass 120.

In the fusion process, pulling rolls 130 are placed downstream of the root 70 of forming wedge 10 and are used to adjust the rate at which the formed ribbon of glass leaves the converging forming surfaces and thus help determine the nominal thickness of the finished sheet. Suitable pulling rolls are described, for example, in U.S. Pat. No. 6,896,646, the contents of which are incorporated in their entirety herein by reference.

The pulling rolls are preferably designed to contact the glass ribbon at its outer edges, specifically, in regions just inboard of the thickened beads which exist at the very edges of the ribbon. The glass edge portions 140 which are contacted by the pulling rolls are later discarded from the substrates after they are separated from the sheet.

In the drawing apparatus shown in FIG. 1, as a glass sheet (glass ribbon) travels down the drawing portion of the apparatus, the sheet experiences intricate structural changes, not only in physical dimensions but also on a molecular level. The change from a supple but thick liquid form at, for example, the root of the forming wedge, or isopipe, to a stiff glass sheet of approximately one half millimeter of thickness is achieved by a carefully chosen temperature field that delicately balances the mechanical and chemical requirements to complete the transformation from a liquid, or viscous state to a solid, or elastic state.

More particularly, as the glass sheet descends below the root to below the pulling rolls, the glass transitions from a viscous state to a visco-elastic state. The visco-elastic region of the glass sheet extends from approximately the softening point of the glass to the strain point of the glass. Below the strain point, the glass is considered to behave elastically.

One advantage to the fusion forming process described above is that the glass sheet can be formed without the glass surface contacting any refractory forming surfaces. This provides for a smooth, contaminant-free surface. In addition, this technique is capable of forming very flat and thin sheets to very high tolerances. However, other sheet forming techniques may also benefit from the present invention, including, but not limited to, the slot draw and redraw forming techniques. In the slot draw technique, molten glass flows into a trough having a machined slot in the bottom. The sheets of glass are pulled down through the slot. The quality of the glass is obviously dependent, among other things, on the accuracy of the machined slot. Redraw processes generally involve pre-forming a glass composition into a block, then reheating and drawing the glass downwardly into a thinner sheet product.

As discussed above, in accordance with various of its aspects, the present invention relates to the cooling rates of glass sheets produced by a fusion draw machine. The cooling rate of a glass sheet can be thought of in terms of either the space or time variation of the temperature of the glass sheet, e.g., the temperature along the centerline of the sheet. As the following discussion shows, the temporal and spatial cooling rates are related by a constant.

Designating the spatial cooling rate as dT/dy and the temporal cooling rate as dT/dt, we can write:

$$\frac{dT}{dy} = \frac{dT}{dt}\frac{dt}{dy}$$

where T is temperature, t is time, y is the coordinate in the pulling (i.e. gravity) direction.

We will now let the mass flow rate in the draw be denoted by 'M' (usually specified in lb/h) and the final product thickness by 'h'. In a draw, the operational flow rate M and target thickness h are specified quantities.

The velocity of the sheet at which the target thickness 'h' is attained is typically referred to as the 'pulling speed', and sometimes 'pulling rate', PR (usually specified in inch/min). From mass conservation, one can write the pulling speed as:

$$PR \equiv \frac{dy}{dt} = \frac{M}{\rho h} = K$$

where $\rho$ is the density of the glass composition, the parameter 'K' is a constant, the first 'triple' equality implies the definition of the PR, and the second equality follows from mass conservation. It should be noted that the dy/dt term is constant and is named as the PR only at the region where the final formed thickness of the sheet is attained. By final formed thickness what is meant is that the glass sheet, as it is drawn from the forming wedge by the pulling roll, has reached a viscosity such that the glass has become essentially frozen, and no substantial changes in thickness occur. In the viscous region, this term is not a constant and varies strongly with position y.

Combining the first and second equations, one obtains:

$$\frac{dT}{dt} = K\frac{dT}{dy}$$

where K is as defined above.

It should be noted that once the draw flow rate M, the glass composition and thus density ρ, and the target thickness h are specified, K is determined. It can not vary independently. Accordingly, the term 'cooling rate' can refer to either the spatial or temporal variation of the temperature of the glass sheet and is so used herein.

Figure 2:
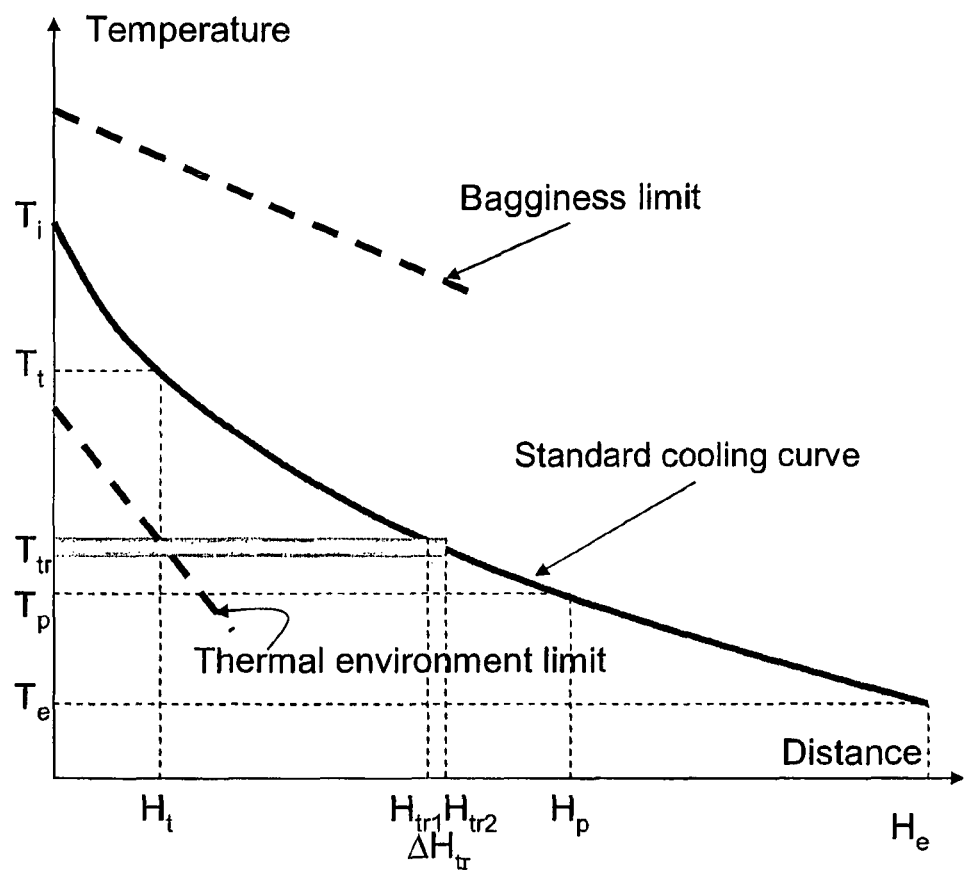
FIG. 2 is a plot of a typical cooling curve used in a fusion downdraw sheet forming process.

Referring now to FIG. 2, this figure summarizes a typical cooling curve used in a fusion downdraw process. For ease of reference, this curve will be referred to as "standard cooling" or "case 0" hereafter. The inlet temperature $T_i$ (i.e., the temperature at the root of the isopipe) and the slope of the curve in the vicinity of the inlet are restricted from above by the "bagginess limit." For thermal conditions that result in temperatures above this limit, the sheet viscosity remains so low that it cannot sustain any pulling force. On the other hand, the cooling curve limitation on the lower temperature side is denoted by the boundary "thermal environment limit" in FIG. 2. This limit is simply due to the fact that the maximum heat flux from a source to a sink in a radiative exchange is limited by the temperature of the sink, the visibility of the source with respect to the sink, and the emissivity of the surfaces.

As is well known, the thickness of the sheet decreases as it is subject to a pulling force. The pulling force is a function of the cooling curve as well as the flow conditions, such as flow rate and glass density. As shown in FIG. 2, after a temperature $T_f$, the sheet attains its final (and minimum) formed thickness under the prescribed pulling force. The distance between the start and the position where the final thickness is attained is denoted as $H_t$ in FIG. 2. The viscous sheet, when cooled further, drops its temperature to $T_{tr}$ where there is a transition between the viscous and elastic regimes. The transition takes place in an interval $\Delta H_{tr}$ whose draw heights vary between $H_{tr1}$ and $H_{tr2}$. Thereafter, the sheet cools down to $T_e$ and exits the draw at a height $H_e$.

The pulling device, e.g., pulling rolls, is preferably placed right after the transition region so that the sheet is viscous enough to be pulled, but not too viscous so that it does not break easily. Also, the pulling device is preferably sufficiently downstream from the transition so that residual stress effects that could propagate upstream are minimized.

Figure 3:
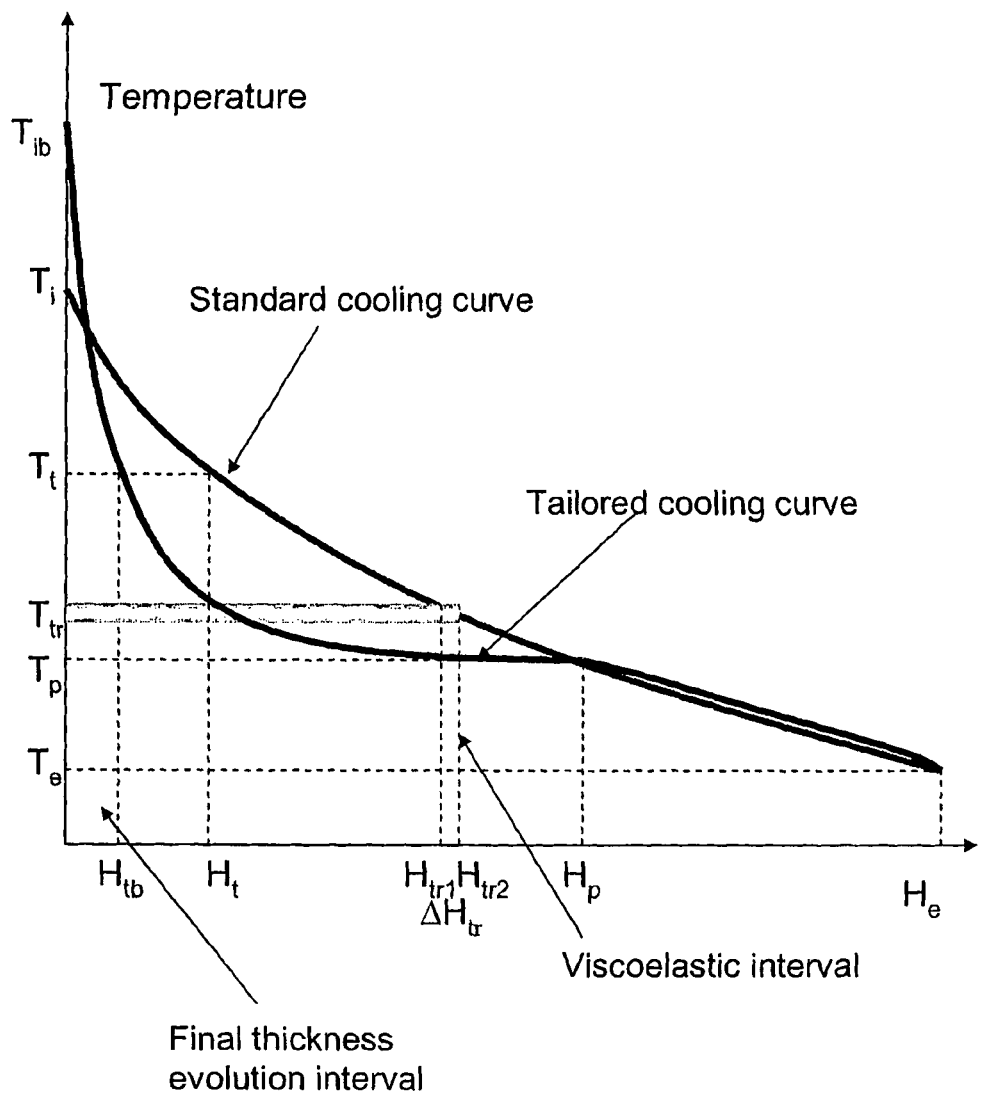
FIG. 3 is a plot of a tailored cooling curve designed to achieve superior substrate and/or production properties compared to those of the standard cooling curve of FIG. 2.

A tailored cooling curve, which employs, among other things, the rapid cooling aspects of the invention, and is thus superior to the "standard cooling" curve of FIG. 2, is shown in FIG. 3. As shown in this figure, the initial temperature $T_{ib}$ is greater than $T_i$ of FIG. 2. The curve of FIG. 3 is advantageous for at least the following reasons:

(1) The sheet enters the draw at a hotter temperature (but below the bagginess limit) so for otherwise comparable conditions, it is thinner.

(2) The hotter temperature of the sheet at the entry to the draw results in the sheet being subject to smaller forces. Reduction of the sheet forces, in turn, results in a sheet with wider dimensions compared to that obtained from a standard process.

(3) The sheet is subject to steeper cooling so that it attains its final thickness faster, i.e., $H_{tb}$ in FIG. 3 is less than $H_t$ in FIG. 2, where $H_{tb}$ denotes the height (or, more specifically, the distance from the root of the isopipe) where the final thickness is attained for the tailored cooling curve.

(4) Decreasing the length of the final thickness evolution zone allows the rest of the draw distance (i.e., $H_e - H_{tb}$) to be used for other purposes, e.g., to improve compaction and/or residual stress. Alternatively, decreasing the length of the final thickness evolution zone allows the overall length of the draw to be reduced which, among other things, reduces capital costs. More particularly, by decreasing the length of the final thickness evolution zone:

(i) Compaction can be decreased by allowing the cooling curve to approach $H_{tr2}$ and $H_p$ with a smaller slope (i.e. slower cooling). See discussion below. Since a substantial amount of temperature drop is achieved early before $H_t$, the rest of the draw can be reserved for this slow cooling process.

(ii) For thermal residual stresses that arise due to the sudden change in thermal expansion coefficient in the viscoelastic interval, the temperature profile can be given a curvature so that no compression band will be generated in the vicinity of the viscoelastic zone, i.e., near $\Delta H_{tr}$.

(iii) Since the initial cooling takes place over a smaller interval, the pulling force position can be optimized, and the height $H_e$ can be shortened if desired. Shortening the draw height results in the reduction of capital investment, and easier operation. Also higher flow densities (increased throughput) can be achieved with existing equipment (see below).

Figure 4:
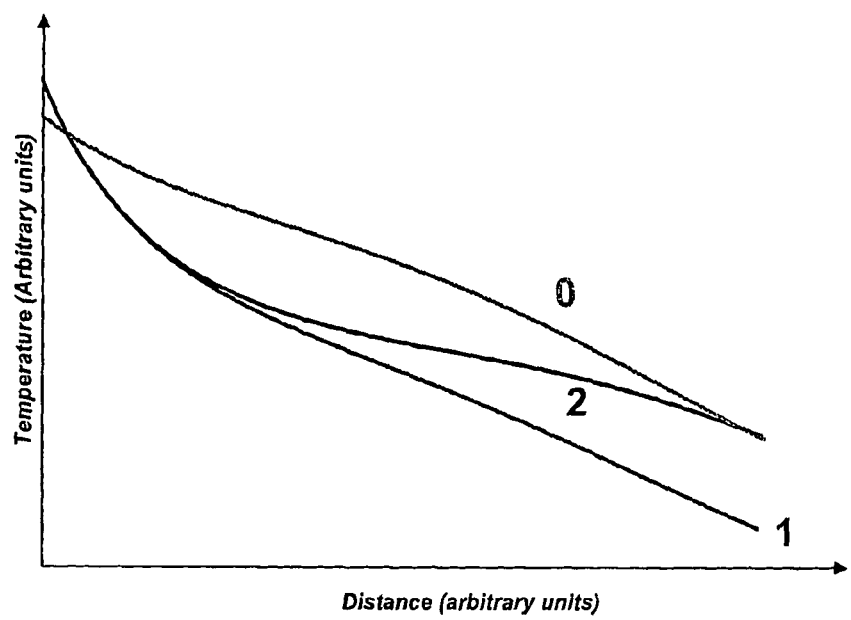
FIG. 4 is a plot of three cooling curves, where the "0" curve is a standard curve and curves "1" and "2" are designed cooling curves for better substrate quality. It should be noted that curve "0" has a lower inlet temperature than curves "1" and "2".
Figure 5:
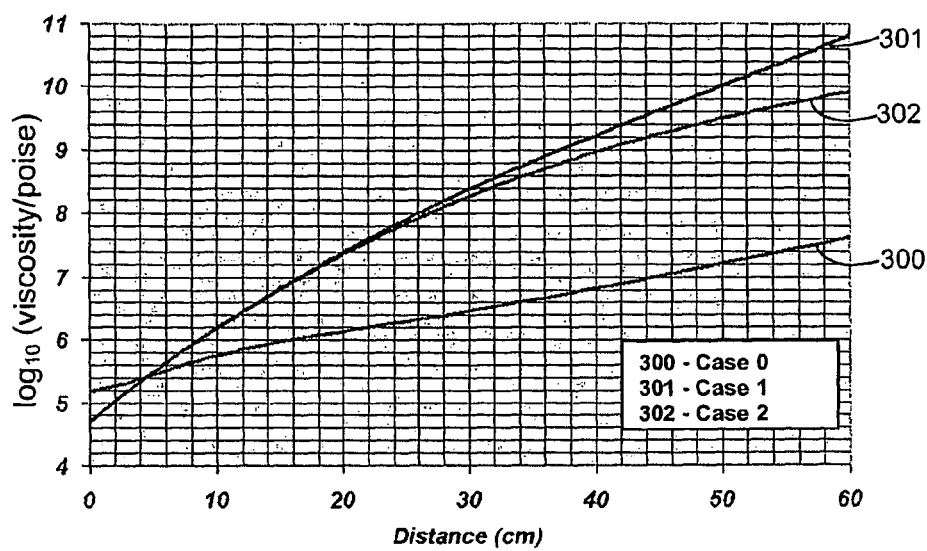
FIG. 5 is a plot of $\log_{10}$(viscosity/poise) versus distance from the root of an isopipe for curves 0, 1, and 2 of FIG. 4.

FIG. 4 further illustrates the effects of using the rapid cooling aspects of the invention. This figure shows three cooling curves, namely, the "0" curve which is a standard curve and curves "1" and "2" which are tailored cooling curves designed to achieve improved sheet qualities. FIG. 5 is a plot of $\log_{10}$(viscosity/poise) versus distance down the draw for the three cases, where viscosity was calculated using a Fulcher fit (see below) for Corning Incorporated's code Eagle glass. Significantly, curves 1 and 2 can be easily attained in practice by setting the position, number and capacity of the heating and cooling elements used in the draw. It should be noted that in FIG. 4, both curves 1 and 2 enter the draw at a higher temperature than curve 0. Correspondingly, curves 1 and 2 enter the draw at lower viscosities than curve 0 in FIG. 5.

Corresponding flow parameters for cases 0, 1, and 2 are given in Table 1. The thickness values of this table, as well as the pulling forces, were calculated using a finite element simulation. As shown in the table, the pulling forces for the three cases are identical even though the inlet viscosity of case 0 is substantially larger than that of cases 1 and 2. As can be seen from the table's thickness values, the final thickness evolution zone ($H_t$) decreases substantially for cases 1 and 2 in comparison to case 0.

The forces (per unit sheet width) for the three cases can be calculated using a one-dimensional force balance. That calculation shows that the sheets of cases 1 and 2 are subject to smaller forces at the inlet. The direct consequence of these reduced forces is a reduction in the natural attenuation of the sheet in the width direction, as well as the reduction in its weight as summarized in Table 2.

The curvature of the cooling profile (i.e. whether it is convex or concave) as the glass undergoes the transition between its viscous and elastic regimes (see $H_{tr1}$ and $H_{tr2}$ in FIG. 2) is important in terms of residual thermal stresses in the glass that arise as a result of the abrupt changes in the glass' coefficient of thermal expansion (CTE) which occur as the transition takes place. Cases 0, 1, and 2 are substantially different in terms of their curvatures in this transition region. Thus, case 0 does not have a built in curvature to compensate residual thermal stresses, while case 1 has some curvature and case 2 has substantial curvature. Accordingly, local temperature setting changes will be needed for case 0, some setting changes will be needed for case 1, but only minor adjustments, if any, will be needed for case 2.

The rapid cooling aspects of the invention can be quantified in various ways. Two particularly convenient approaches for such quantification involve determining the average heat flux from the glass sheet in the rapid cooling section of the cooling curve (referred to herein as the "$\bar{q}$" value) or determining the rate of viscosity change (increase) with distance down the draw in that section (referred to herein as the "R" value). Each approach uses as reference points the lower apex of the converging forming surfaces used to produce the glass sheet (e.g., the root of the isopipe) and the location down the draw where the glass sheet reaches its final thickness. Each approach also requires knowledge of the temperature of the glass sheet at the lower apex (see, for example, $T_i$ and $T_{ib}$ for the standard and tailored cooling curves of FIG. 3, respectively) and the location where the sheet reaches its final thickness (see, for example, $T_t$ in FIG. 3). In particular, such temperature information is for the outside surface of the glass sheet along the sheet's centerline. These temperatures can be measured by various techniques known in the art, such as with pyrometers and/or contact thermocouples.

As a moving sheet of glass cools from temperature $T_1$ to $T_2$ ($T_1 > T_2$), it must lose heat energy at a rate $Q_H$ (joules/second or watts) given by:

$$Q_H = M \cdot C_p \cdot \Delta T \tag{1}$$

where M is the glass' flow rate (grams/second), $C_p$ is the glass' specific heat capacity (Joule/gram-° C.), and $\Delta T = T_1 - T_2$ (° C.).

As used herein, the phrase "average heat flux from a glass sheet" (i.e., $\bar{q}$) between a first location (e.g., the root of an isopipe) having a first centerline temperature $T_1$ and a second location (e.g., the location where the sheet reaches its final thickness) having a second centerline temperature $T_2$ is defined in terms of Equation (1) and an average surface area representative of the portion of sheet which is cooling. Specifically, the area is taken to be equal to $W \cdot D$ where W is the width of the substrates cut from the glass sheet after trimming of non-quality edge portions and D is the distance along the sheet's centerline between the first and second locations. $\bar{q}$ is then given by:

$$\bar{q} = (M \cdot C_p \cdot \Delta T)/(W \cdot D). \tag{2}$$

It should be noted that in terms of achieving the heat losses called for by various aspects of the invention, $\bar{q}$ as calculated using Equation (2) represents a worse case scenario in that the $W \cdot D$ product corresponds to the area of one side of the sheet, whereas in the typical case heat will be removed from both sides of the sheet, as well as from the bead areas along the edges of the sheet.

For example, in a case where equal amounts of heat are lost from the two sides of the sheet, the flux through each of the two sides will be on the order of $\bar{q}/2$. If $\bar{q}$ is 40 kilowatts/meter$^2$, then the fluxes through each of the two sides of the sheet only need to be on the order of 20 kilowatts/meter$^2$ for this equal loss case. However, if the heat loss through one of the sides is smaller, then the heat loss through the other side must be correspondingly larger to achieve the overall $\bar{q}$ value, e.g., in the limit if the heat loss through one of the sides were to be zero, then the flux through the other side would have to be equal to $\bar{q}$. It is in this sense that $\bar{q}$ provides a measure of the maximum heat transfer that could be needed if heat loss were limited to only one of the sheet's major surfaces. In normal practice, both surfaces will be employed, so the heat transfer levels needed for each side will be much lower, e.g., $\bar{q}/2$.

From the above, it can be seen that for the heat flux approach to quantifying rapid cooling, in addition to knowledge of the temperature of the glass sheet at the lower apex and the location where the sheet reaches its final thickness, knowledge of the glass' flow rate M and specific heat capacity $C_p$, as well as the width W of substrates cut from the sheet and the distance D between the lower apex and the location where the sheet reaches its final thickness, are also required. All of this information is readily available to persons skilled in the art who practice the fusion downdraw process.

In accordance with the rapid cooling aspects of the invention, $\bar{q}$ is equal to or greater than 40 kilowatts/meter$^2$, preferably equal to or greater than 60 kilowatts/meter$^2$, and most preferably equal to or greater than 70 kilowatts/meter$^2$.

For the viscosity change approach (R approach), in addition to knowledge of the temperature of the glass sheet at the lower apex ($T_{apex}$) and at the location where the sheet reaches its final thickness ($T_{final\ thickness}$), knowledge of the glass' viscosity ($\mu$) as a function of temperature, as well as the distance D between the lower apex and the location where the sheet reaches its final thickness, are required. Viscosity versus temperature information is obtained by measuring the glass' viscosity using ASTM C1350M at a set of temperatures and then fitting the resulting values to the following expression (the Fulcher equation) to obtain values for A, B, and $T_0$ (the Fulcher coefficients), where $T_0$ is in Celsius:

$$\log_{10}(\mu(T)/\text{poise}) = A + B/(T/\text{Celsius} - T_0) \tag{3}$$

Using A, B, and $T_0$ values for the specific glass being drawn and the above equation, the average rate R (meter$^{-1}$) of viscosity change with distance down the draw is then calculated as:

$$R = (\log_{10}(\mu(T_{final\ thickness})/\text{poise}) - \log_{10}(\mu(T_{apex})/\text{poise}))/D \tag{4}$$

(Note that R can also be viewed as the inverse of the characteristic length for viscosity variation down the draw.)

In accordance with the rapid cooling aspects of the invention, R is equal to or greater than 6.0 meter$^{-1}$, preferably equal to or greater than 8.0 meter$^{-1}$, and most preferably equal to or greater than 9.0 meter$^{-1}$.

Table 3 shows $\bar{q}$ and R values for cases 0, 1, and 2 of FIG. 4. The $\bar{q}$ calculations used a mass flow of 750 pounds/hour, a specific heat capacity of 1300 Joules/kg-° K, $\Delta T$'s of 294.5, 379.2, and 364.9° C. for cases 0, 1, and 2, respectively, a W value of 58.5 inches, and the following distances D obtained from the finite element simulation; $D_{case\ 0} = 88.3$ centimeters; $D_{case\ 1} = 50.0$ centimeters; and $D_{case\ 1}2 = 54.0$ centimeters. The same D values were used for the R calculations along with the following viscosities obtained using Fulcher coefficients for Corning Incorporated's code Eagle glass (i.e., $A = -3.027$, $B = 7194.3$ and $T_0 = 297$): Case 0—$\log_{10}(\mu_{root}/\text{poise}) = 5.20$, $\log_{10}(\mu_{final\ thickness}/\text{poise}) = 9.40$; Case 1—$\log_{10}(\mu_{root}/\text{poise}) = 4.70$, $\log_{10}(\mu_{final\ thickness}/\text{poise}) = 9.50$; and Case 2—$\log_{10}(\mu_{root}/\text{poise}) = 4.70$, $\log_{10}(\mu_{final\ thickness}/\text{poise}) = 10.32$. As can be seen in this table, $\bar{q}$ is less than 40 kilowatts/meter$^2$ and R is less than 6.0 meter$^{-1}$ for case 0 (the standard case), but above these values for cases 1 and 2 (the rapid cooling cases).

As discussed above, reducing the compaction exhibited by glass substrates has been a long standing challenge to glass manufacturers and, in particular, to glass manufacturers using the fusion downdraw process. Table 4 shows predicted relative levels of compaction for cases 0, 1, and 2 of FIG. 4 for several thermal cycles representative of the types of cycles a glass substrate will experience during the manufacture of a liquid crystal display, i.e., exposure to 350° C. for 15 minutes, 450° C. for 60 minutes, 600° C. for 30 minutes, and 450° C. for 60 minutes followed immediately by 600° C. for 30 minutes.

As shown in Table 4, the tailored cooling curves of cases 1 and 2 had predicted compactions lower than those of case 0. Especially impressive is the reduced compaction of case 2 where the predicted compaction was more than 30% lower than that of case 0 for all of the heat cycles. As can be seen in FIG. 4, after its rapid cooling phase, case 2 has a much flatter thermal profile than either case 0 or case 1. As will now be shown, flatter thermal profiles of this type (which correspond to slower cooling rates), and, in particular, such flatter thermal profiles/slower cooling rates between at least the viscosities of $10^{11}$ poises and $10^{14}$ poises (preferably between $10^{11}$ poises and $10^{15}$ poises, most preferably between $10^{11}$ poises and $10^{16}$ poises) have been found to consistently predict low levels of compaction.

Figure 6A:
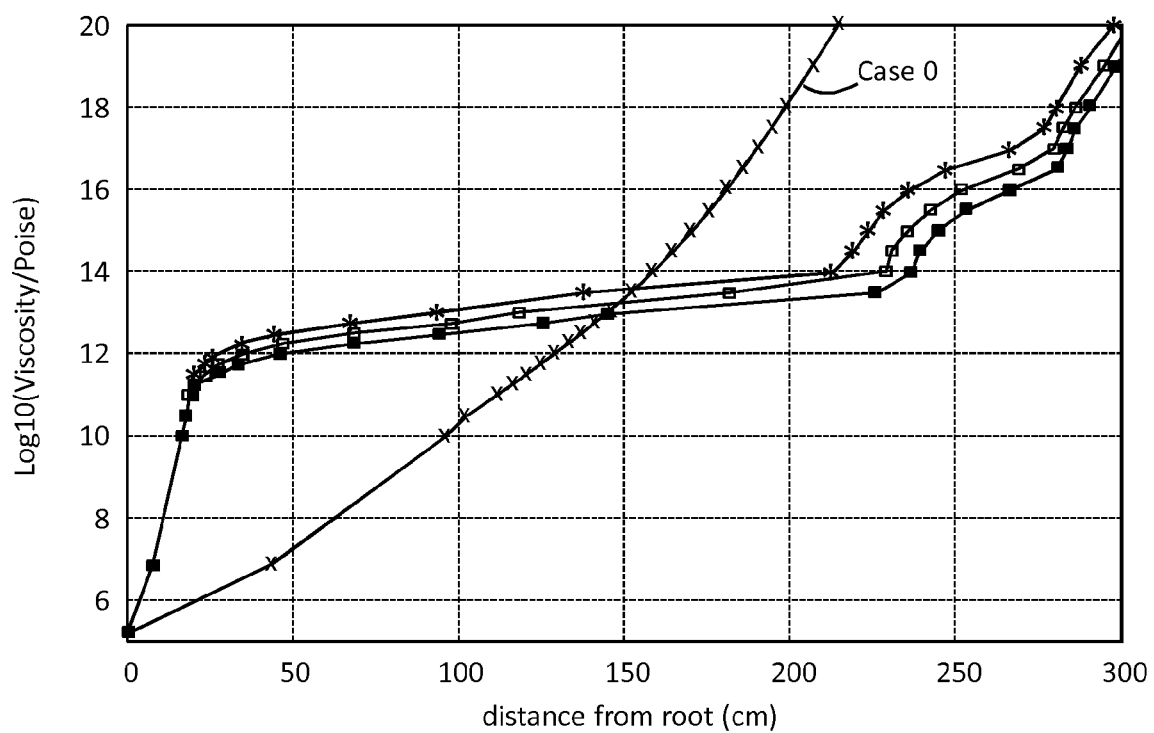
FIG. 6A is a plot of $\log_{10}$(viscosity/poise) versus distance from the root of an isopipe for curve 0 of FIG. 4 (case 0) and for three curves having cooling rates which result in reduced compaction compared to case 0.
Figure 6B:
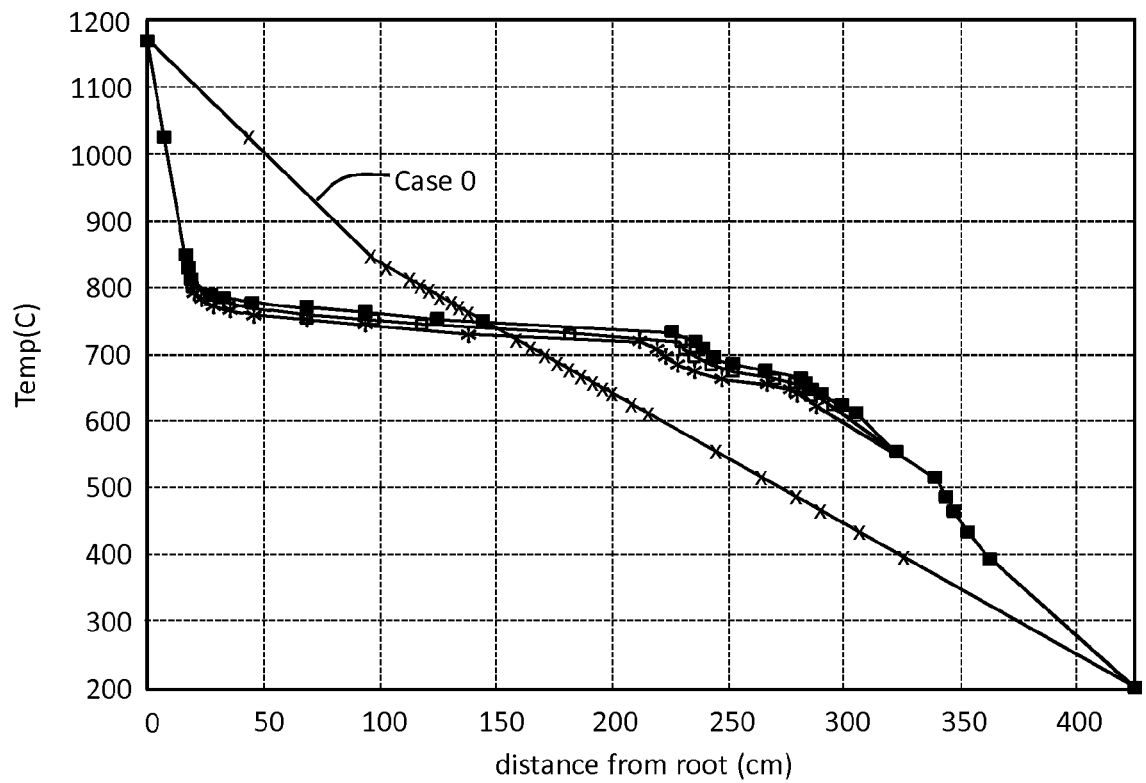
FIG. 6B shows the same data with the vertical axis being temperature rather than $\log_{10}$ (viscosity/poise).

FIGS. 6A and 6B show the results of an analysis of the effects of cooling rate on compaction. These figures were obtained by running a series of optimization runs to find the lowest predicted compaction levels. The starting point was case 0 of FIG. 4. At selected (distance, temperature) points below the apex corresponding initially to temperatures in the region from 1025° C. to 265° C. (viscosities from about $10^{6.8}$ poise to beyond Fulcher curve validity), the location at each temperature was allowed to move higher or lower on the draw until the sum of the absolute values of the modeled compaction was minimized. More particularly, the case 0 root temperature (T=1170° C.) and location were held constant as were all locations and temperatures beyond 428.5 centimeters from the root (T=200° C. and below). As a result, the optimized cooling curves were required to start at the same (distance, temperature) point at the root and then join up with the case 0 (distance, temperature) points at (428.5 cm, 200° C.) and below, while adopting a different and optimized path between 0 and 428.5 cm.

The data points shown by stars, open boxes, and closed boxes in FIGS. 6A and 6B represent draw speeds of 50 inches/minute, 91 inches/minute, and 150 inches/minute, respectively. The calculated compaction levels for these three draw speeds were 0.649, 0.646, and 0.647 of the calculated compaction for the case 0 profile for the same draw speed. That is, the flatter curves reduced the compaction by 35% compared to the base case for the same draw speed. Significantly, this decrease in compaction was achieved notwithstanding the fact that the overall magnitude of the compaction was increasing as the draw speed increased, i.e., the magnitude of the improvement provided by the flatter curves increased as the draw speed increased.

As can be seen from FIG. 6A, all of the compaction-optimized curves exhibited a corner at approximately $10^{11}$ poise and a low slope region which extended to approximately $10^{14}$ poise. Thereafter, the slope increased somewhat but was still below the case 0 slope through about $10^{16}$ poise.

As with the rapid cooling aspects of the invention, the aspects of the invention relating to slow cooling to achieve reduced compaction can be quantified in various ways. Average heat flux and rate of viscosity change with distance down the draw are again particularly convenient approaches for such quantification since they are based on data (e.g., temperature versus distance measurements, specific heat capacity, flow rate, Fulcher coefficients, etc.) which is readily available in a commercial setting.

The average heat flux is again given by Equation (1), but D is now the distance down the draw between the location where the glass has a viscosity of $10^{11}$ poise and the location where it has a viscosity of $10^{14}$ poise (or $10^{15}$ poise or $10^{16}$ poise, as the case may be) and ΔT is the temperature difference between those locations. As with rapid cooling, the measured data used in determining the average heat flux is temperature along the centerline of the glass sheet, with viscosity being determined using Equation (3) and the appropriate Fulcher coefficients for the glass being processed.

In accordance with the slow cooling aspects of the invention, $\bar{q}$ is less than or equal to 20 kilowatts/meter², preferably less than or equal to 18 kilowatts/meter², and most preferably less than or equal to 15 kilowatts/meter² over at least the $10^{11}$ to $10^{14}$ poise range, preferably over the $10^{11}$ to $10^{15}$ poise range, and most preferably over the $10^{11}$ to $10^{16}$ poise range.

The viscosity approach for quantifying slow cooling again uses Equation (4), but as with the heat flux approach, D is now the distance down the draw between the location where the glass has a viscosity of $10^{11}$ poise and the location where it has a viscosity of $10^{14}$ poise (or $10^{15}$ poise or $10^{16}$ poise, as the case may be) and the numerator in Equation (4) is 3 when the upper viscosity is $10^{14}$ poise, 4 when it is $10^{15}$ poise, and 5 when it is $10^{16}$ poise. Thus, as representative examples, for the $10^{11}$ to $10^{14}$ poise range, Equation (4) becomes:

$$R_{11-14} = 3/D_{11-14},$$

and for the $10^{11}$ to $10^{16}$ poise range, it becomes:

$$R_{11-16} = 5/D_{11-16}$$

where $D_{11-14}$ and $D_{11-16}$ are the distances down the centerline from $10^{11}$ to $10^{14}$ poise and from $10^{11}$ to $10^{16}$ poise, respectively.

In accordance with the viscosity approach, slow cooling corresponds to an R value which is less than or equal to 4.0 meter$^{-1}$, preferably less than or equal to 3.0 meter$^{-1}$, and most preferably less than or equal to 2.0 meter$^{-1}$ over at least the $10^{11}$ to $10^{14}$ poise range, preferably over the $10^{11}$ to $10^{15}$ poise range, and most preferably over the $10^{11}$ to $10^{16}$ poise range.

Returning to FIGS. 6A and 6B, a typical compaction for case 0 of these figures and a mass flow of 750 pounds/hour is 15-19 ppm for a thermal cycle of 450° C. for 1 hour. Holding the distance between the root and the location where the glass reaches a temperature of 200° C. constant and applying slow cooling (i.e., a $\bar{q}$ value that is less than or equal to 20 kilowatts/meter² and/or an R value which is less than or equal to 4.0 meter$^{-1}$) over the $10^{11}$ to $10^{14}$ poise range will reduce the compaction by approximately 10 percent, while a $\bar{q}$ value that is less than or equal to 15 kilowatts/meter² and/or an R value which is less than or equal to 2.0 meter$^{-1}$ will result in a reduction in compaction of at least 20 percent. The use of longer slow cooling ranges, e.g., from $10^{11}$ to $10^{16}$ poise will even further reduce these compaction levels. For example, as discussed above, the compaction-optimized curves of FIGS. 6A and 6B exhibited a reduction in compaction by more than a third.

It should be noted that these improvements in compaction also depend on the rate of cooling at higher viscosities (lower temperatures). Although these higher viscosities have much less effect on compaction, it is possible to undo the compaction improvements achieved by slow cooling in the $10^{11}$ to $10^{14}$ range (or the $10^{11}$ to $10^{15}$ range, or the $10^{11}$ to $10^{16}$ range) by using too high a cooling rate at viscosities above the upper end of the range. Cooling rates of the type used for case 0 can be used at these higher viscosities. Somewhat faster cooling rates can also be used, but cooling rates that exceed about 10° C./cm should, in general, be avoided.

Referring again to FIG. 1, the fusion draw process illustrated in this figure is capable of producing very high quality glass sheets provided the molten glass on the isopipe forming surfaces 50, 60 has a sufficiently high viscosity. It is currently believed that a viscosity not lower than about 100,000 poises is required. Below this threshold, warping of the glass may be observed. The consequence is that glasses which have liquidus viscosities lower than about 100,000 poise have not been able to be drawn into commercially acceptable sheets. If nominal viscosity conditions (e.g. flow rates, pulling force, cooling rates etc.) are used, devitrification may occur on the isopipe, causing defects in the sheet; and if the viscosity of the glass is decreased, warp may occur. The ability to draw glass compositions with liquidus viscosities below about 100,000 poise would therefore have great value. In particular, compositions with a higher strain point than about 665° C. may be useful for certain display glass applications, such as in the p-Si deposition process. If, for example, a glass having a 750° C. strain point is required, no fusion-formable composition has been identified to date which would result in an acceptable drawn glass sheet. The ability to form high strain point, low liquidus viscosity glasses via a fusion downdraw process could open the method to a range of new and potentially useful glass compositions.

Current downdraw processes operate with a pulling force of about 50 N/m. That is, pulling rolls 130 located below the root of the isopipe pull the glass sheet downward with a pulling force of approximately 50 N/m. The reasons for maintaining such a significant downward pulling force are twofold:

(i) In the viscous region a vertical pull stress translates into a transverse stress which is several times lower than the vertical stress. A significant vertical force is therefore required for the sheet to remain in transverse tension.

(ii) A high pulling force minimizes the effect of gravity on the glass. With insufficient vertical pulling force, the glass sheet exhibits "bagginess" or baggy warp.

In accordance with the principles of the present invention, rapid cooling of the glass as it descends below the isopipe root may be used to facilitate the drawing of high strain point, low viscosity glasses via a fusion downdraw process. The rapid cooling principle can be further explained by the following equations of iso-viscous sheet draw. For example, the required pulling force can be represented by the equation:

$$F_p = \frac{4\mu Q}{L}\ln\left(\frac{d}{h}\right) \quad (5)$$

where $F_p$ is the pulling force, $\mu$ is the viscosity of the glass at the root of the forming wedge, Q is the volumetric glass flow per unit width, d is the thickness of the glass sheet at the root of the forming wedge, h is the final thickness of the glass sheet (i.e. after the sheet thickness has been "frozen in"), and L is the draw distance measured from the root to the location where the glass sheet first has the final thickness (i.e., L corresponds to $H_t$ and $H_{tb}$ in FIGS. 2 and 3, respectively. As indicated by Equation (5), in order to decrease the glass viscosity while maintaining a given pulling force to achieve a predetermined final thickness, a decrease in L may be needed. This means attenuating the thickness of the glass sheet faster to obtain a final thickness over a shorter distance. Under non-isothermal conditions, where thickness will continue decreasing until the glass is set up, this means the glass must set up faster, e.g. be cooled more rapidly.

Another possible approach is to increase Q (glass flow per unit width) to achieve the predetermined final thickness over the same distance L. However, under non iso-viscous conditions, this means setting up the glass over the same distance as in the standard case: increased cooling (heat extraction) is required due to the increased glass flow.

A variety of approaches may be used to represent glass temperature change as a function of distance from the root. For example, the change in temperature may be viewed as ramped, wherein the temperature of the glass is seen as consisting within segments of constant temperature, or the change in temperature may be represented by a constant slope. Alternatively, the temperature may be depicted by a hyperbolic curve represented by an equation of the form T=a+(b/(x+c)) where T is temperature in ° C. and x is the vertical distance downward from the root of the isopipe. A small value of the parameter "c" corresponds to a large initial temperature slope, whereas the curve corresponding to a large value of "c" approaches a linear curve.

Consider, for example, a glass having a glass viscosity curve represented by Equation (3) above (the Fulcher equation) with A=−3.027, B=7194.3 and $T_0$=297 (i.e., constants that may be used to represent, for example, Corning code Eagle glass). To simplify the analysis, a flow rate of 11 lb/hr/inch from a plate having parallel sides is used to represent the flow of glass over the converging forming surfaces 50, 60 of forming wedge (isopipe) 10, and a viscosity of the glass at the base of the plate is further assumed to be 133,392 poise, with a temperature of 1155° C. at the base and 750° C. at a location 1.27 m below the base of the plate (below the root of the forming wedge). A hyperbolic temperature curve may then be chosen for a standard case (case A) such that a 50 N/m pulling force is obtained 1.27 m below the root for a 0.7 mm final glass sheet thickness. The initial thickness of the glass, $d_0$, as it leaves the base of the plate is assumed to be the thickness resulting from flow along each side of the vertical plate:

$$d_0 = 2\left(\sqrt[3]{\frac{3\mu Q}{2\rho g}}\right) \quad (6)$$

where, as is conventional, g is the gravitational constant and $\rho$ is density.

Using the above temperature distribution (i.e., T=a+(b/(x+c))), Equation (3) for the viscosity of the glass as a function of temperature with the above constants, and Equation (6) for the initial thickness, one can calculate the thickness as a function of distance from the root of the isopipe using the following equation which assumes that the width of the sheet is constant and that the temperature does not change through the thickness of the sheet:

$$\frac{\partial}{\partial x}\left[\frac{\mu}{e}\frac{\partial e}{\partial x}\right] = \frac{\rho g e}{4Q} \quad (7)$$

where e is sheet thickness, $\mu$ is viscosity, x is distance down the sheet, Q is volumetric flow per unit width (meter$^2$/second), and $\rho$ and g are again density and the gravitational constant, respectively. Equation (7) does not have an analytical solution. However, it can be solved using, for example, a $4^{th}$ order Runge Kutta technique.

Figure 7:
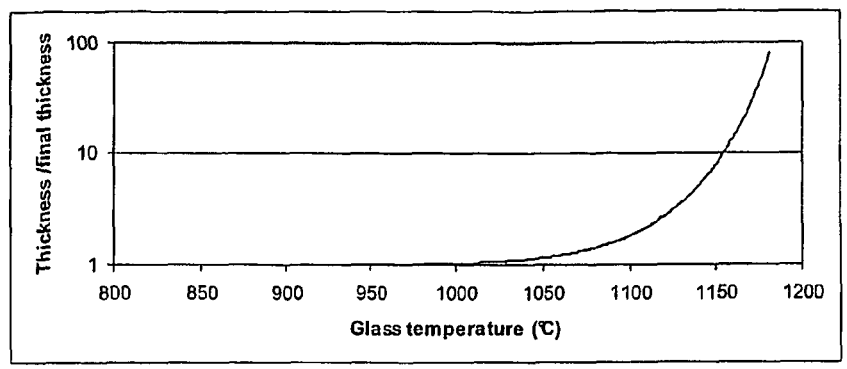
FIG. 7 is a plot of glass sheet thickness as a function of temperature for the standard case (case A).
Figure 8:
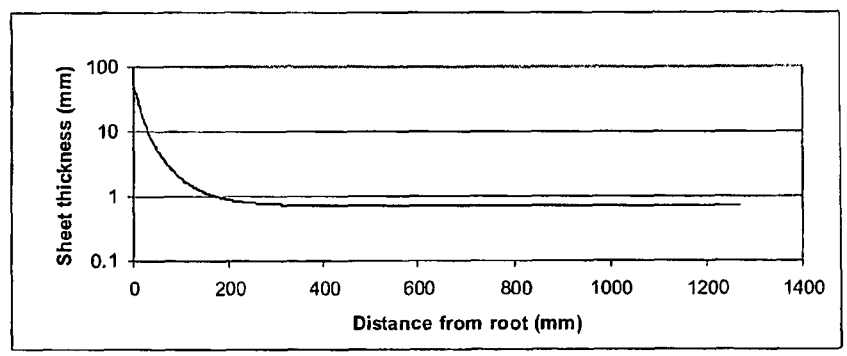
FIG. 8 is a plot of glass sheet thickness as a function of distance from the root for the standard case (case A).

Several results from the above equations are shown in FIGS. 7-9. As can be seen from the figures, below 950° C., which corresponds approximately to the softening point of the glass, the final thickness is obtained about 390 mm below the base of the plate (FIGS. 7-8). It is apparent from FIG. 9 that the gravity component of the vertical force accounts for only about 47% of the total force, with the largest contribution being observed at the root.

Several variations of the above analysis may be performed as follows, all leading to the same final thickness:

Case A—Standard case as described above;

Case B—Start from a lower viscosity (50,000 vs. 130,000 poises) while maintaining a constant spatial temperature profile and flow rate;

Case C—Start from a lower viscosity (50,000 vs. 130,000 poises) at the same flow rate as in case B, and modifying the temperature profile to maintain a given pulling force. In this case a 750° C. temperature 1 m below the root was maintained constant;

Case D—Start from a lower viscosity (50,000 vs. 130,000 poises) while maintaining a constant spatial temperature profile, and modifying the flow rate to maintain a given pulling force.

Figure 11:
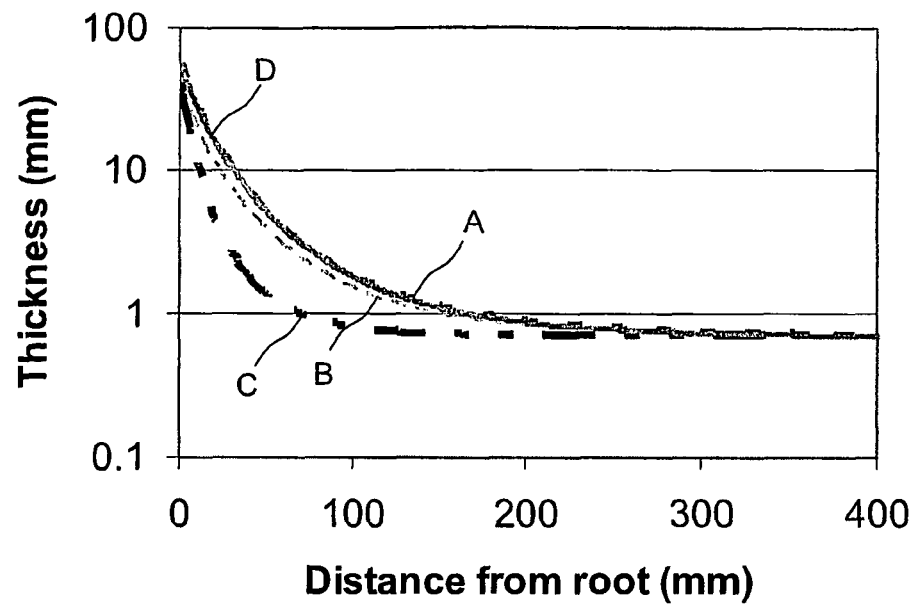
FIG. 11 is a plot of sheet thickness as a function of distance from the root of a fusion downdraw apparatus for the four hypothetical cases of FIG. 10.
Figure 12:
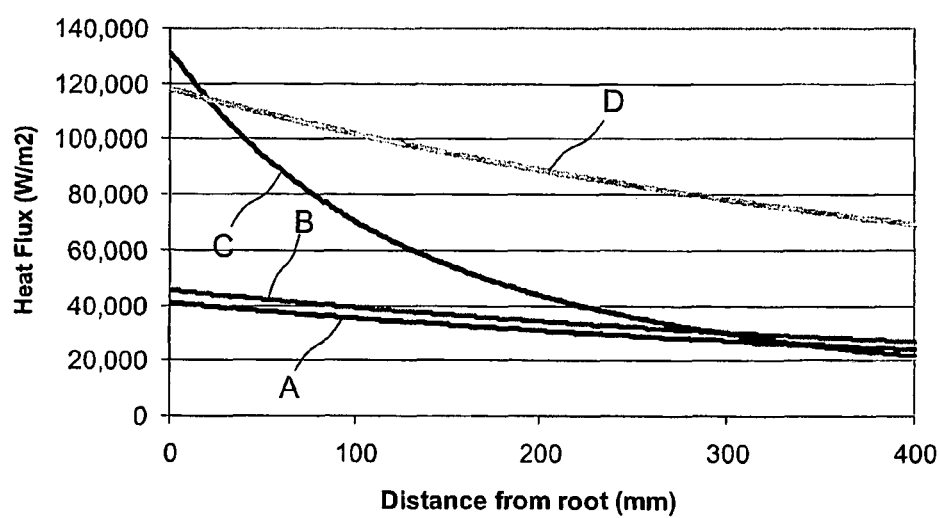
FIG. 12 is a plot of heat extraction (heat flux) as a function of distance from the root of a downdraw apparatus for the four hypothetical cases of FIG. 10.

The results of the above analysis are summarized numerically in the table provided in FIG. 10 and graphically in FIGS. 11-12. As indicated in FIG. 10, decreasing the viscosity from approximately 130,000 as given in the standard Case A to about 50,000 poise in Case B while maintaining essentially the same cooling curve as in the standard case (Case A) results in a decrease in pulling force from 50 N/m to 3.5 N/m, and a very significant increase in the gravity contribution, from 47% to 91%. Thus, the glass sheet formed in accordance with case B is formed with a close to 0 pulling force and may prove unacceptable from a glass quality perspective. That is, the pulling force decrease combined with an increase in the gravity contribution to the pulling force may result in so-called baggy warp of the glass sheet. Referring to FIG. 12, case B is achieved with an average heat extraction rate ($\bar{q}$) of less than about 40,000 W/m², similar in magnitude to the heat extraction present in case A.

On the other hand, a low viscosity glass may be drawn under a similar cooling curve as case A and B, albeit at a higher heat extraction rate, if the glass flow rate is allowed to increase to 2.59 times the standard case (i.e. 28.45 lbs/hr/in), as shown in case D. In case D, a total pulling force of 50 N/m achieves a low gravity contribution of approximately 47% and a final glass sheet thickness of 0.7 mm. The final thickness of the glass sheet is attained at a distance of about 386 mm from the base of the plate, comparable to cases A and B.

As shown by the data in Case C, by rapidly cooling the glass within a very short distance from the base of the plate (e.g. the root of the isopipe), the pulling force can be returned to approximately 50 N/m and the glass sheet reaches a final formed thickness much sooner than in the previous cases, as is clearly evident from FIG. 11. In case C, the viscosity of the glass at the base of the plate is again approximately 50,000 poises. However, the gravity contribution to the total pulling force is at the lowest of the four cases (about 36%), and the glass reaches its final formed thickness in about half the distance as the other cases, a mere 187 mm from the base of the plate. FIG. 12 indicates that the required heat extraction within 400 mm of the base of the plate is about 120,000 W/m² at the base of the plate, but is reduced to just about 20,000 W/m² at a location 400 mm from the base, for an average heat extraction rate ($\bar{q}$) of about 75,000 W/m². As indicated by FIGS. 10-12, a glass having a viscosity at the isopipe root of only 50,000 poises can be drawn under conditions such that the drawing characteristics of the low-viscosity glass closely resemble the drawing characteristics of much higher viscosity glasses by appropriate adjustment of the drawing conditions.

Figure 13:
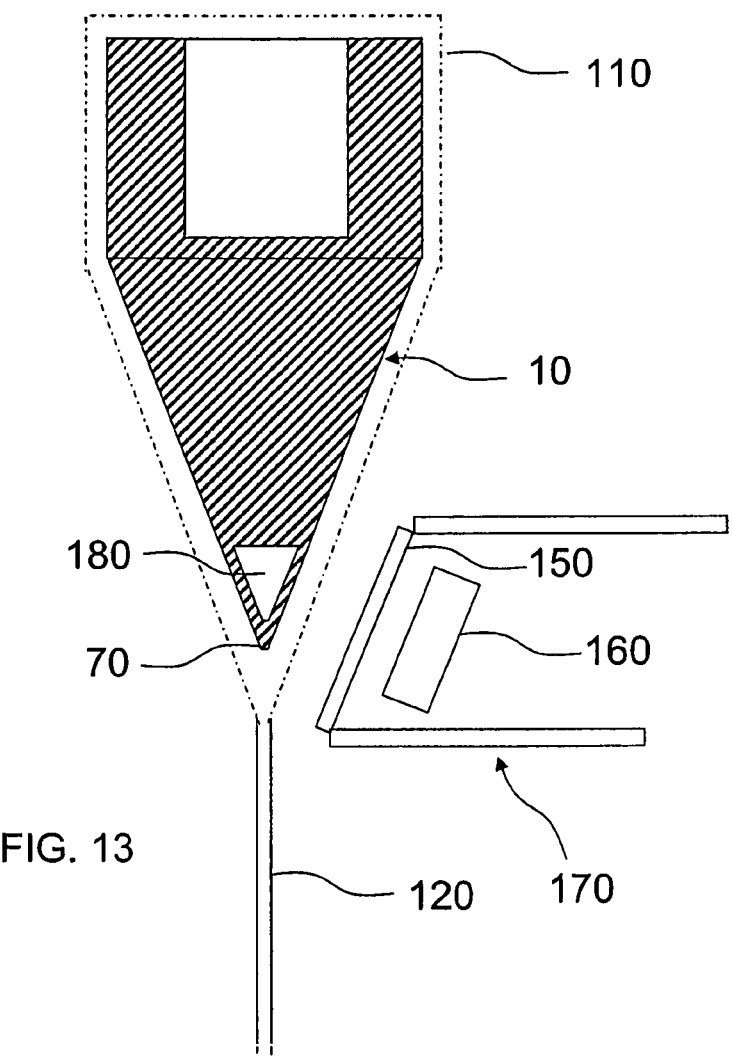
FIG. 13 is a cross sectional view of a fusion draw apparatus showing the placement of heaters and/or cooling devices in accordance with an embodiment of the present invention.

Rapid cooling of the glass ribbon below the root of the isopipe may be attained by radiation or convection. For example, as demonstrated in FIG. 13, rapid cooling of the glass sheet may be accomplished through the use of an apparatus as taught in U.S. Pat. No. 3,682,609, wherein the glass is exposed to a plate 150 behind which heating and/or cooling element 160 is located. Plate 150 may comprise a portion of enclosure 170 which contains element 160. Heating and/or cooling element 160 may include such devices as electric resistance heaters or piping through which flows a heated or cooled liquid. Plate 150 located between heating and/or cooling means 160 serves to diffuse the heating or cooling, thereby distributing the heating or cooling effect more evenly across the width of glass sheet 120. It may be desirable in some instances to heat forming wedge 10 at one or more locations, preferably within the structure of the wedge, to ensure that the wedge remains at a predetermined temperature. Heating of the forming wedge may be accomplished, for example, by embedding heating element 180, such as electric resistance heaters, within the structure of the isopipe. For example, heating element 180 may be embedded within the forming wedge proximate the root, as shown in FIG. 13. See also U.S. Provisional Application No. 60/748,887, filed Dec. 8, 2005, and entitled "Method and Apparatus for Drawing a Low Liquidus Viscosity Glass," which is incorporated in its entirety herein by reference. Other methods of heating the isopipe as are known in the art may also be used where appropriate.

Figure 14:
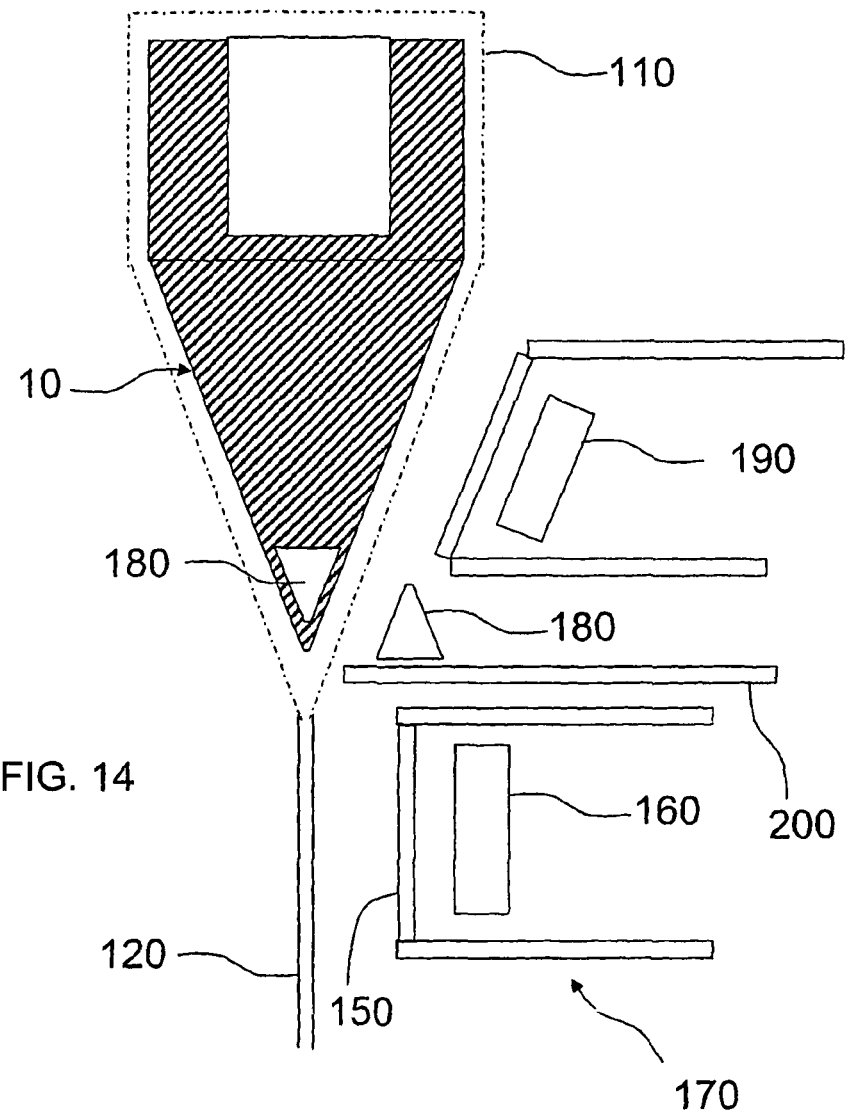
FIG. 14 is a cross sectional view of a fusion draw apparatus showing the placement of heaters and/or cooling devices in accordance with another embodiment of the present invention.

In the instance wherein the heating and/or cooling means is supplemental to a second heating and/or cooling element 190 above (upstream relative to the glass flow), heating and/or cooling element 160 may be separated from the upper portions of the isopipe by baffle 200 to preventing rapid cooling of the glass sheet below the isopipe root from disrupting the flow of glass over the forming wedge, as might occur due to thermal air currents created by temperature differentials in the air surrounding the wedge (FIG. 14). Of course, combinations of these arrangements may be used without detracting from the principles of the invention.

To summarize, based on the foregoing considerations, an optimized temperature curve for a fusion draw process can be developed both in connection with the design of a new draw or for an existing draw which is to be used with a different glass composition and/or a different draw speed. The following are several considerations that can be taken into account in the cooling curve design process:

Bagginess Limit: The initial temperature $T_i$ and the slope of the curve in its vicinity are restricted by the 'bagginess limit'. If the root viscosity and the temperature drop rate are too low, the glass sheet rapidly attenuates even under its own weight and the desired final sheet thickness cannot be obtained with positive pulling force at the pulling rolls.

Devitrification: The root temperature is typically the lowest temperature of the glass layer next to the isopipe. It cannot be below the devitrification point of the glass; otherwise crystal growth causes gross deterioration of glass quality.

Thermal control/heat flux limit: The cooling rate of the glass sheet around the root cannot exceed its maximum value limited mainly by radiation heat transfer between the hot glass sheet and the temperatures of the sink (walls), the glass-wall view factors and the emissivity of the surfaces. Another restriction on the temperature drop comes from the use of apparatus of the type shown in U.S. Pat. No. 3,682,609 to control across-the-sheet thickness variation. If the temperature curve slope is too steep, the attenuation length $H_t$ may become too short for sufficient heat exchange from the glass to the apparatus of this patent.

Residual stresses: Increase of the glass temperature drop rate around the transition interval $\Delta H_{tr}$ leads to compression residual stresses causing warps (out of plane deformations). On the other hand, positive curvature of the temperature curve in the interval causes tensile stresses favorable from a deformation viewpoint. The glass temperature at the pulling rolls $T_p$ needs to be below the transition interval, otherwise the pulling rolls can cause additional residual stresses. However, the value of $T_p$ cannot be too much below the transition range.

Minimized compaction: As discussed above, the compaction resistance of the glass sheet improves when the glass temperature drop in the viscoelastic transition range has a smaller slope.

As one example of the application of the principles discussed above, a cooling curve can be designed using the following steps:

(1) The root temperature $T_i$ is chosen only slightly above (say, 10°) the devitrification point.

(2) The initial cooling curve slope is chosen as the maximum allowing stable thermal control.

(3) Based on points 1 and 2, the pulling force required for the process is numerically evaluated. If the value is a negative, the glass forming process will be problematic.

(4) The temperature $T_p$ at the pulling rolls is chosen slightly below the transition range. If the position of the pulling rolls can be changed, the resulting available space below the pulling rolls can be used to reduce the slope of the remaining part of the cooling curve. Alternatively, the overall draw length can be reduced.

(5) The curvature (sign of the second derivative) of the cooling curve in the transition region is preferably positive.

As another example, a cooling curve can be designed by:

(1) From a standard operation on a glass previously manufactured by a fusion draw operation, determine the most aggressive cooling curve allowing stable thermal control.

(2) Determine lowest root viscosity allowing sufficient pulling force to be retained.

(3) Design transition from initially aggressive cooling to carefully controlled cooling to control stress and compaction.

(4) Use space gained by the more aggressive initial cooling for improved stress and compaction management.

As a further example, the procedure immediately above is used but instead of taking advantage of the increased space for improved stress and compaction management, the throughput is increased until the cooling rate in the compaction/stress regions equals the original set up. In this way, increased productivity can be achieved with unchanged properties in the finished substrates.

In connection with each of the above design examples, numerical modeling of the process can be used to determine the number, positions, and power levels of heating/cooling elements located along the length of the draw.

Figure 15:
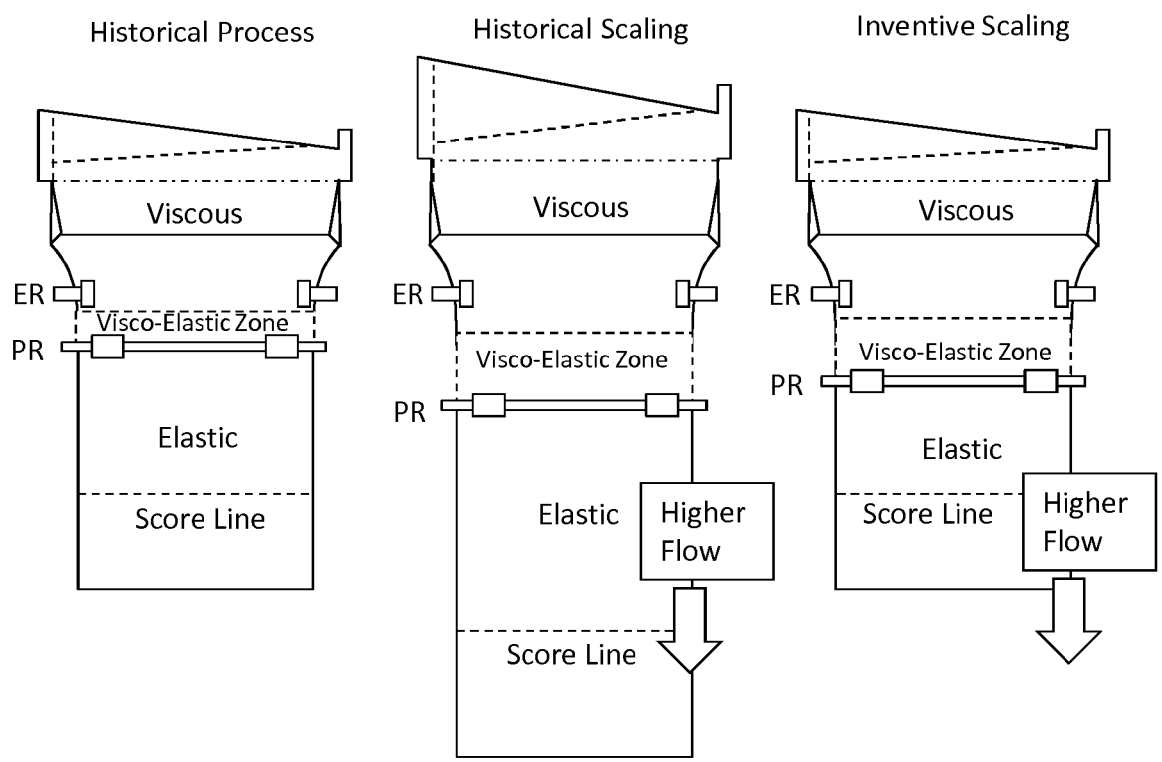
FIG. 15 compares the inventive scaling disclosed herein (right hand panel) with historical scaling (middle panel). Both scalings are applied to the historical process of the left hand panel. The abbreviations "ER" and "PR" used in this figure refer to edge rollers and pulling rolls, respectively.

As a further example of the application of various of the principles of the invention, FIG. 15 illustrates a method for increasing the throughput (flow rate) of a fusion draw machine without a linear increase in its length as previously believed to be necessary to avoid unacceptable increases in compaction.

As discussed above, as a glass moves through its cooling profile it goes through a number of glass states: viscous, visco-elastic, and elastic. Historically, all of these areas have been scaled with flow increases to minimize the risk of unacceptable increases in compaction. However, as illustrated in FIG. 15, if different scaling rules are applied to each of the glass states, compaction can be maintained while still keeping a fusion draw machine in an existing physical envelope. In some cases, this may mean shortening the elastic portion of the sheet (ribbon) so that the substrate is at a higher temperature when separated from the sheet. The substrate may then undergo substantial cooling after being separated from the sheet, but since the glass is in an elastic state, such cooling has a minimum effect on compaction.

In FIG. 15, the left hand panel illustrates the viscous, visco-elastic, and elastic zones of a historical process, the middle panel illustrates the changes to these zones that would be made to achieve higher flow in accordance with the historical practice of scaling all three zones to the same extent, and the right hand panel illustrates the inventive approach of the present disclosure wherein each of the different zones of the glass is given a length appropriate for the increased flow, with the lengths being chosen to minimize increases (if any) in the overall length of the ribbon.

Figure 16:
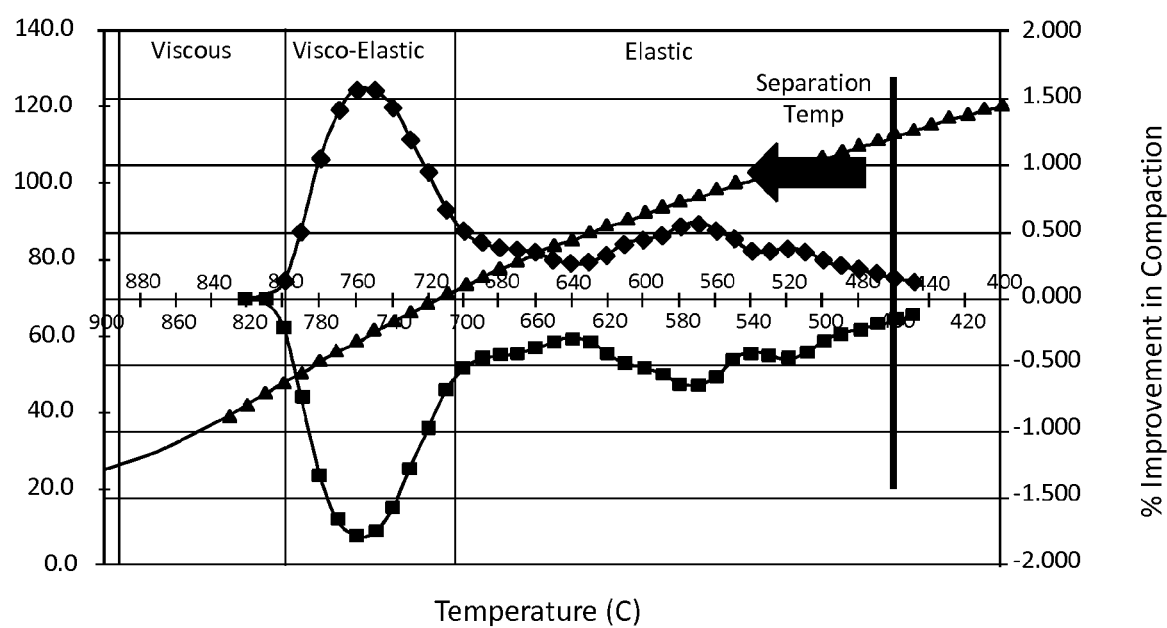
FIG. 16 shows changes in compaction resulting from 50% increases (diamond data points) and 50% decreases (square data points) in the dwell time for 10° C. increments applied to the case 0 cooling curve (triangular data points). The left hand vertical axis shows distance from the root of the isopipe in inches for the triangular data points, while the right band vertical axis shows the improvement in compaction in %.

As glass leaves an isopipe it is in a viscous state. Accordingly, this zone does not need to be scaled with flow increases if the equivalent heat extraction is achieved within a similar distance. Radiation dominates this region of the cooling curve, helping minimize risks associated with thickness variations. As illustrated in FIG. 16, any cooling approach that maintains the same temperature profile and shape entering the visco-elastic zone of the glass will be effective in terms of not unduly increasing compaction. Specifically, FIG. 16 shows the effects on calculated compaction of increasing or decreasing the dwell time at particular temperatures along a typical cooling curve used in the fusion process. As can be seen in this figure, dwell time increases and decreases of 50% (diamond and square data points, respectively) had no effect on compaction when those increases/decreases took place in the viscous zone. Accordingly, as shown in the right hand panel of FIG. 15, in accordance with the inventive scaling principles, the viscous zone is held at substantially a constant length, with rapid cooling (e.g., cooling at an average heat flux greater than or equal to 40 kilowatts/meter$^2$; see above) being used to accommodate the higher flow rate so that the sheet reaches its final thickness in a distance similar to that used in the left hand panel.

In the visco-elastic region of the glass cooling curve, compaction, residual shape, and stress are determined. This is the important region of the glass forming process to scale with flow to maintain the same compaction or to improve compaction. The ability of changes in dwell time to affect compaction in this zone is illustrated in FIG. 16. Accordingly, as shown in the right hand panel of FIG. 15, the visco-elastic zone of the glass and, in particular, the region where the glass' viscosity is increasing from $10^{11}$ to $10^{14}$ poise, is adjusted (increased) with flow rate to maintain the same compaction or, if desired, to improve compaction. Such increase in the visco-elastic zone is in general at least linear with flow rate, but preferably is greater than linear as illustrated in FIG. 15.

The elastic zone continues the process of improving compaction, but at much lower levels (see FIG. 16). This region can thus be thought of as a "non-value add" region of the process which merely acts as a transition from the visco-elastic zone to final product. Accordingly, this region should be minimally scaled with flow to minimize the risks associated with the handling of long ribbons and the effects of temporary stresses induced by uneven cooling in this region. Such minimal scaling can be achieved by raising the score temperature. In general, separating as close to the visco-elastic zone as possible is desirable in order to maintain overall height of the draw and thus help ensure a stable process as the flow rate increases.

Although the elastic zone can be scaled to some extent with flow, preferably, the exit temperature (e.g., the temperature at the score line) is simply allowed to migrate (increase) as necessary to achieve the desired overall length of the ribbon, e.g., a length equal to that of historical process. As illustrated in the right hand panel of FIG. 15, in some cases, this may mean that the elastic zone ends up with a length shorter than that used in the historical process. Any remaining low level structural changes in the glass that occur below the elevated score temperature will continue to occur after the substrate has been separated from the ribbon.

Figure 17:
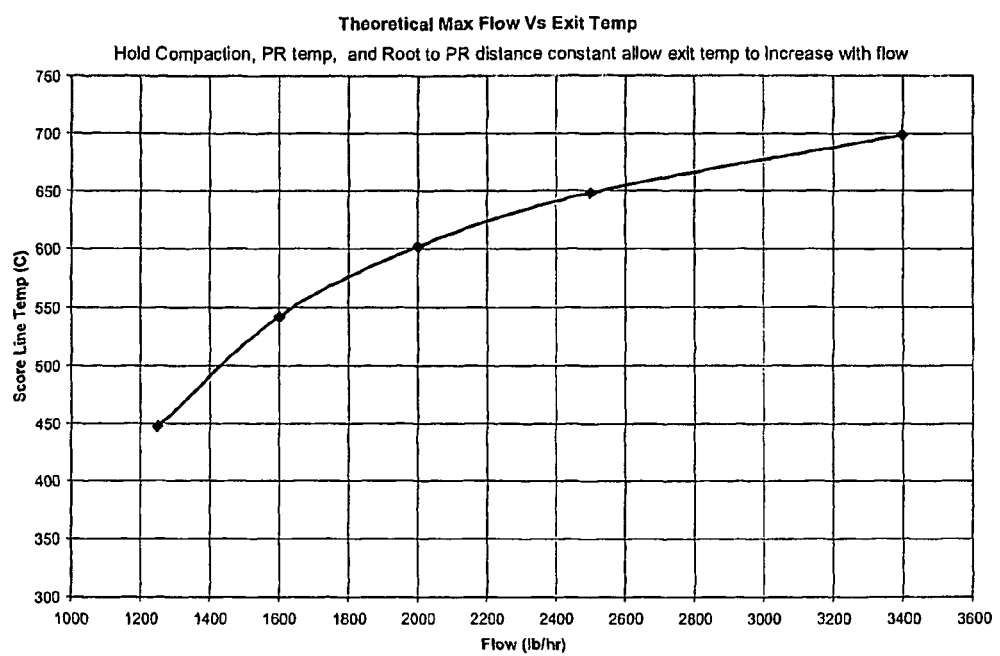
FIG. 17 illustrates the use of hotter cutoff temperatures (score line temperatures) to achieve higher flow rates while holding compaction, pulling roll (PR) temperature, and root-to-pulling roll distance ($D_{PR}$) constant.

FIG. 17 illustrates the application of the above principles to the case 0 cooling curve. In particular, this figure plots increase in score line temperature as a function of flow rate where rapid cooling is used to hold the pulling roll temperature and the root-to-pulling roll distance constant. Overall draw length is also held constant. The calculated compaction levels were essentially unchanged, thus demonstrating that increases in the cutoff temperature can be used to achieve enhanced flow rates for a given draw length without compromising compaction.

Quantitatively, the above scaling principles can be characterized in terms of (1) the distance between the root of the isopipe and the pulling rolls (PR in FIG. 15) and (2) the distance between the root and the score line. Designating the root-to-pulling roll distance as $D_{PR}$ and the root-to-score line distance as $D_{SL}$, a fusion machine which has been constructed in accordance with the scaling principles described herein will preferably have a $D_{PR}/D_{SL}$ ratio which is equal to or greater than 0.5 and, more preferably, equal to or greater than 0.8. Because the score line needs to be in the elastic zone and because the pulling rolls are typically at the end of or just after the visco-elastic zone, the upper limit on the $D_{PR}/D_{SL}$ ratio is approximately 1.0. For comparison, the $D_{PR}/D_{SL}$ ratios for historical processes (left hand panel in FIG. 15) have been on the order of 0.24-0.42. With the historical approach to scaling (middle panel of FIG. 15), these ratios are maintained, rather than increased, as the flow rate increases.

The inventive scaling principles can also be characterized in terms of the ratio of $D_{SL}$ to the glass' flow rate per unit width (FR). Historically, the $D_{SL}/FR$ ratio needed to achieve a compaction of 19±3 ppm for a 1 hour soak at 450° C. has been 10 or greater, where $D_{SL}$ is in inches and FR is in pounds/hour/inch. In accordance with the scaling approaches described herein, this ratio can be reduced to 8 or less. Such a reduction represents a significant reduction in the capital expense associated with scaling a melt process for additional flow and thus additional production capacity. In particular, it means that at least a 20% increase in output can be achieved for, for example, the same length draw. In addition, as discussed above, maintaining a shorter overall process allows for greater process stability and easier process control, thus minimizing the costs associated with the losses that inevitably occur with a longer process.

Figure 18:
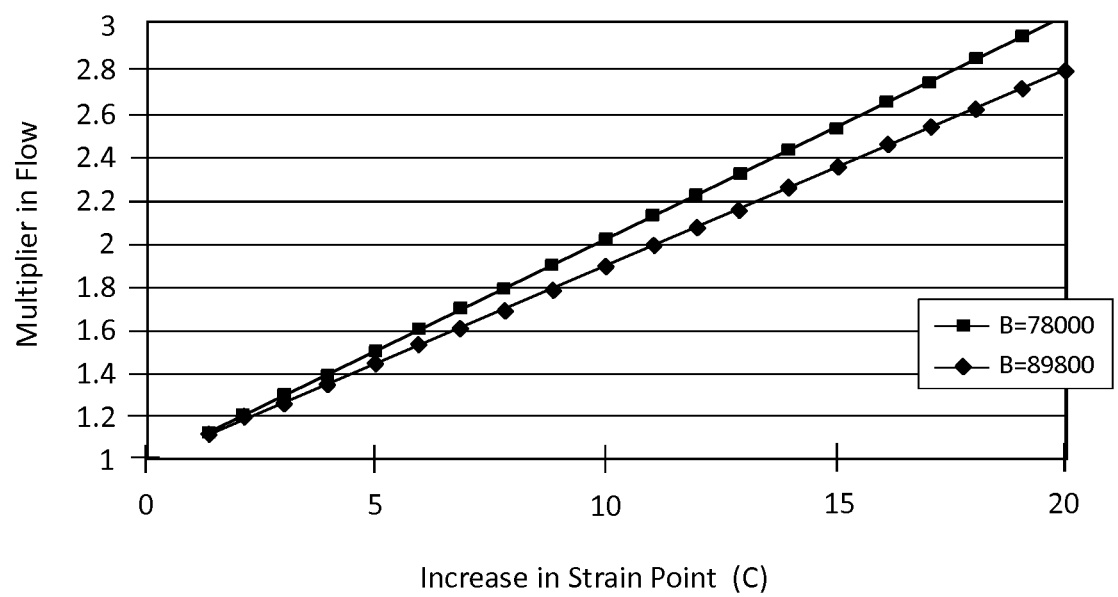
FIG. 18 is a plot illustrating how an increase in strain point can allow flow to be increased, i.e., multiplied by the flow multiplier, without increasing the compaction of substrates formed from a glass sheet.

The above improvement in the $D_{SL}/FR$ ratio has assumed that the strain point of the glass being produced has remained the same, i.e., at the value used in the historical process. The historical $D_{SL}/FR$ ratios of 10 and above were achieved for a glass having a strain point of 667° C. An additional approach for increasing flow without compromising compaction is to increase the glass' strain point. In particular, it has been found that increases in strain point allow the flow rate to be increased in accordance with the following equation:

$$\Delta FR/FR = B \cdot \Delta T_S/(T_S)^2$$

where $T_S$ is the historical strain point of the glass in degrees Kelvin, $\Delta T_S$ is the change in strain point ($\Delta T_S \leq 20°$ C.), and B is the activation energy of the glass which is typically in the range of 78000-89800° K$^{-1}$. FIG. 18 is a plot of the based on this equation which shows how increases in strain point can be used to achieve increases in flow, all other things being equal. Using this figure and assuming a historical strain point of 667° C., the $D_{SL}/FR$ ratios which characterize scaling in accordance with the above principles become:

$$D_{SL}/FR \leq 8 \cdot (1.0 + 0.1 \cdot (T_S - 667)).$$

where in this equation $T_S$ is the glass' strain point in ° C. (Note that for $\Delta T_S > 20°$ C., $T_S$ is taken to be 687° C.)

From the foregoing, it can be seen that, among other things, the invention provides methods for forming glass sheets (glass ribbons) which comprise: (1) rapidly cooling the glass sheet after its initial formation, (2) slowly cooling the sheet over selected regions of the drawing process, and/or (3) separating substrates from the sheet at elevated temperatures. The methods enable one or more of: (a) the drawing of low liquidus viscosity glasses via a fusion downdraw process, (b) the production of substrates using that fusion downdraw process that exhibit low levels of thermal compaction and thus are suitable for use in, for example, the manufacture of liquid crystal displays, (c) the more efficient use of fusion downdraw equipment, and/or (d) reduced capital costs for such equipment.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

TABLE 1

| Case | Thickness at $H_e/13$ | Thickness at $H_e/9$ | Thickness at $H_e/7$ | Thickness at $H_e/3$ | Inlet Viscosity | Pulling Force |
|---|---|---|---|---|---|---|
| 0 | 4t | 2t | 1.7t | 1.1t | P | F |
| 1 | 1.2t | 1.04t | 1.01t | t | P/3 | F |
| 2 | 1.2t | 1.04t | 1.01t | t | P/3 | F |

TABLE 2

| Case | Force Exerted on Sheet at Inlet | Sheet Natural Attenuation | Sheet Weight at $H_p$ |
|---|---|---|---|
| 0 | T | A | W |
| 1 | T/1.95 | A/1.95 | 0.57W |
| 2 | T/1.95 | A/1.95 | 0.57W |

TABLE 3

| Case | $\bar{q}$ (Kilowatts/meter$^2$) | R (meter$^{-1}$) |
|---|---|---|
| 0 | 31.4 | 4.75 |
| 1 | 82.4 | 9.59 |
| 2 | 76.4 | 10.41 |

TABLE 4

| Case | 350° C., 15 m | 450° C., 60 m | 600° C., 30 m | 450° C., 60 m THEN 600° C., 30 m |
|---|---|---|---|---|
| 0 | C1 | C2 | C3 | C4 |
| 1 | 0.94 C1 | 0.97 C2 | 0.95 C3 | 0.95 C4 |
| 2 | 0.60 C1 | 0.67 C2 | 0.65 C3 | 0.65 C4 |

What is claimed is:

1. A method for manufacturing a glass substrate with reduced compaction comprising:

flowing a molten glass over converging forming surfaces to form a glass ribbon, the forming surfaces converging adjacent a lower apex;

cooling the glass ribbon at a first rate such that an average rate R of viscosity change with distance is equal to or greater than 6.0 meter$^{-1}$, where R is given by:

$$R = (\log_{10}(\mu_{final\ thickness}/\text{poise}) - \log_{10}(\mu_{apex}/\text{poise}))/D$$

where:
(a) $\mu_{apex}$ is the viscosity in poise at a centerline of the glass ribbon at the lower apex,
(b) $\mu_{final\ thickness}$ is the viscosity in poise at the centerline where the glass ribbon has reached a final thickness,
(c) D is the distance along the centerline between said two viscosities;

cooling the glass ribbon at a second rate such that as the viscosity at the centerline of the glass sheet increases from $10^{11}$ poise to $10^{16}$ poise, an average rate $R_{11-16}$ of viscosity change with distance is less than or equal to 4.0 meter$^{-1}$, where $R_{11-16}$ is given by:

$$R_{11-16} = 5/D_{11-16}$$

and where $D_{11-16}$ is the distance along the centerline between said two viscosities; and separating the glass substrate from the glass ribbon at a score line.

2. The method according to claim 1, wherein the glass substrate, when exposed to a temperature of 450° C. for 60 minutes, exhibits a compaction that is less than or equal to 19±3 ppm.

3. The method according to claim 1, wherein R is equal to or greater than 9.0 meter$^{-1}$.

4. The method according to claim 1, wherein $R_{11-16}$ is less than or equal to 2.0 meter$^{-1}$.

5. The method according to claim 1, further comprising cooling the glass ribbon at a rate that does not exceed 10° C./cm after the glass ribbon has reached a viscosity greater than $10^{16}$ poise.

6. The method according to claim 1, further comprising drawing the glass ribbon with pulling rolls and wherein a ratio $D_{PR}/D_{SL}$ is equal to or greater than 0.8, where $D_{PR}$ is the distance from the lower apex to the pulling rolls and $D_{SL}$ is the distance from the lower apex to the score line.

7. A method of forming a glass substrate with reduced compaction comprising:

flowing a molten glass over converging forming surfaces to form a glass ribbon, the forming surfaces converging at a lower apex;

cooling the glass ribbon at a first rate wherein an average heat flux from the glass ribbon is equal to or greater than 40,000 W/m$^2$ between the lower apex and a point on the glass ribbon where the glass ribbon has reached a final formed thickness;

cooling the glass ribbon at a second rate wherein as the viscosity at the centerline of the glass ribbon increases over a first range from $10^{11}$ poises to $10^{16}$ poise, an average heat flux from the glass ribbon over the first range is less than or equal to 20,000 W/m$^2$;

cooling the glass ribbon at a rate that does not exceed 10° C./cm after the glass ribbon has reached a viscosity greater than $10^{16}$ poise; and separating the glass substrate from the ribbon.

8. A method of forming a glass substrate with reduced compaction comprising:

flowing a molten glass over converging forming surfaces to form a glass ribbon, the forming surfaces converging at a lower apex;

cooling the glass ribbon at a first rate wherein an average heat flux from the glass ribbon is equal to or greater than 40,000 W/m$^2$ between the lower apex and a point on the glass ribbon where the glass ribbon has reached a final formed thickness;

cooling the glass ribbon at a second rate wherein as the viscosity at the centerline of the glass ribbon increases over a first range from $10^{11}$ poises to $10^{16}$ poise, an average heat flux from the glass ribbon over the first range is less than or equal to 20,000 W/m$^2$;

drawing the glass ribbon with pulling rolls wherein a ratio $D_{PR}/D_{SL}$ is equal to or greater than 0.8, where $D_{PR}$ is the distance from the lower apex to the pulling rolls and $D_{SL}$ is the distance from the lower apex to the score line; and separating the glass substrate from the ribbon.

* * * * *